(12) United States Patent
Akiyama et al.

(10) Patent No.: US 8,983,529 B2
(45) Date of Patent: Mar. 17, 2015

(54) COMMUNICATION SYSTEM, INFORMATION RECORDING MEDIUM, AND RELAY COMMUNICATION DEVICE

(75) Inventors: Tomoya Akiyama, Tokyo (JP); Kei Ohsugi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 243 days.

(21) Appl. No.: 13/702,160

(22) PCT Filed: Jun. 7, 2011

(86) PCT No.: PCT/JP2011/063025
§ 371 (c)(1),
(2), (4) Date: Dec. 5, 2012

(87) PCT Pub. No.: WO2011/155483
PCT Pub. Date: Dec. 15, 2011

(65) Prior Publication Data
US 2013/0078910 A1  Mar. 28, 2013

(30) Foreign Application Priority Data

Jun. 7, 2010 (JP) ................... 2010-129734
May 19, 2011 (JP) ................... 2011-112877
May 19, 2011 (JP) ................... 2011-112879

(51) Int. Cl.
*H04M 1/00* (2006.01)
*H04B 5/00* (2006.01)
*G06K 19/077* (2006.01)
*H04B 5/02* (2006.01)

(52) U.S. Cl.
CPC ........ *H04B 5/0093* (2013.01); *G06K 19/07749* (2013.01); *H04B 5/0081* (2013.01); *H04B 5/0075* (2013.01); *H04B 5/02* (2013.01); *G06K 19/07756* (2013.01)

USPC ......... 455/550.1; 455/18; 455/90.3; 455/333; 340/572.7; 343/866

(58) Field of Classification Search
USPC ........... 455/18, 19, 90.3, 550.1, 556.1, 556.2, 455/313, 323, 333, 334; 340/10.1, 572.7; 343/866
See application file for complete search history.

(56) References Cited

U.S. PATENT DOCUMENTS 6,373,447 B1 * 4/2002 Rostoker et al. .............. 343/895
7,333,786 B2 * 2/2008 Kikuchi et al. ............... 455/130

(Continued)

FOREIGN PATENT DOCUMENTS

| JP | 10-320514 | 12/1998 |
| JP | 2002-308437 | 10/2002 |

(Continued)

OTHER PUBLICATIONS
International Search Report of PCT/JP2011/063025.

(Continued)

*Primary Examiner* — Nhan Le
(74) *Attorney, Agent, or Firm* — Locke Lord LLP; Jeffrey D. Hsi

(57) ABSTRACT

The disclosed communication system, information recording medium, and relay communication device allow communication via electromagnetic induction, allow the use of low-cost information recording media, improve communication stability when information recording media is misaligned or rotated, and provide high IC-chip tolerance to flexion in information recording media. An information recording medium (3-1) has: an IC chip (32-1) that is capable of communication via electromagnetic induction; and a pair of thin conductive sheets (21-1) connected to the IC chip (32-1). A relay medium (2-1) has thin conductive sheets (31-1) and a loop antenna (22-1), with one of said thin conductive sheets (31-1) connected to one end of the loop antenna (22-1) and the other thin conductive sheet (31-1) connected to the other end of the loop antenna (22-1). A read/write device (1-1) has a loop antenna (12-1).

15 Claims, 28 Drawing Sheets

(56) References Cited

U.S. PATENT DOCUMENTS

| | | | |
|---|---|---|---|
| 7,865,214 B2* | 1/2011 | Kushima | 455/562.1 |
| 8,712,323 B2* | 4/2014 | Pahlavan et al. | 455/41.1 |
| 2002/0036977 A1 | 3/2002 | Lenssen et al. | |

FOREIGN PATENT DOCUMENTS

| | | |
|---|---|---|
| JP | 2003-044817 | 2/2003 |
| JP | 2003-085510 | 3/2003 |
| JP | 2005-110131 | 4/2005 |
| JP | 2006-109396 | 4/2006 |
| JP | 2008-187653 | 8/2008 |
| JP | 2009-135632 | 6/2009 |
| WO | WO-98/40930 A1 | 9/1998 |

OTHER PUBLICATIONS

Extended European Search Report for EP Application No. 11792440.7, mailed Mar. 25, 2014.

* cited by examiner

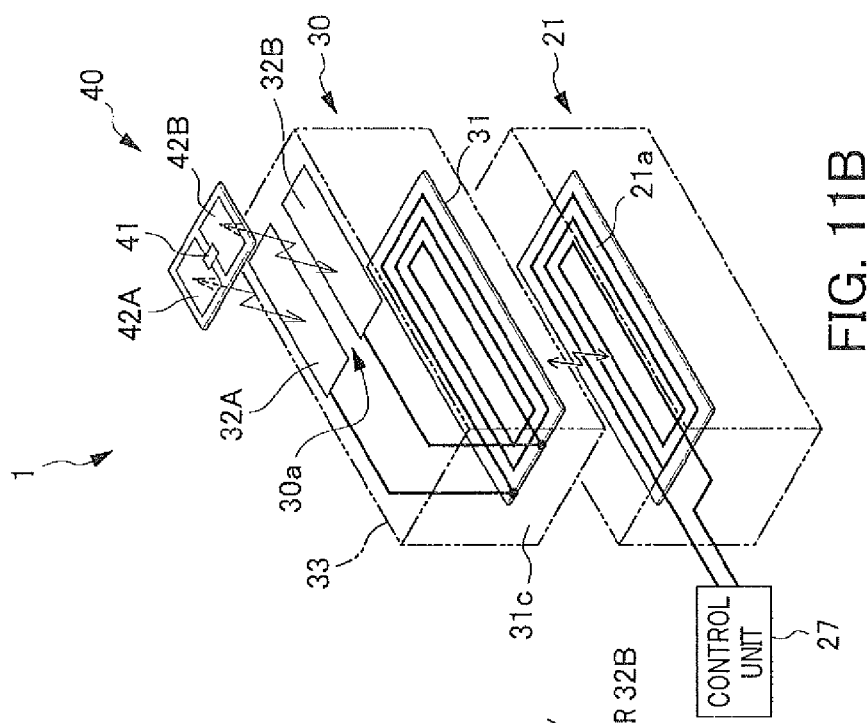
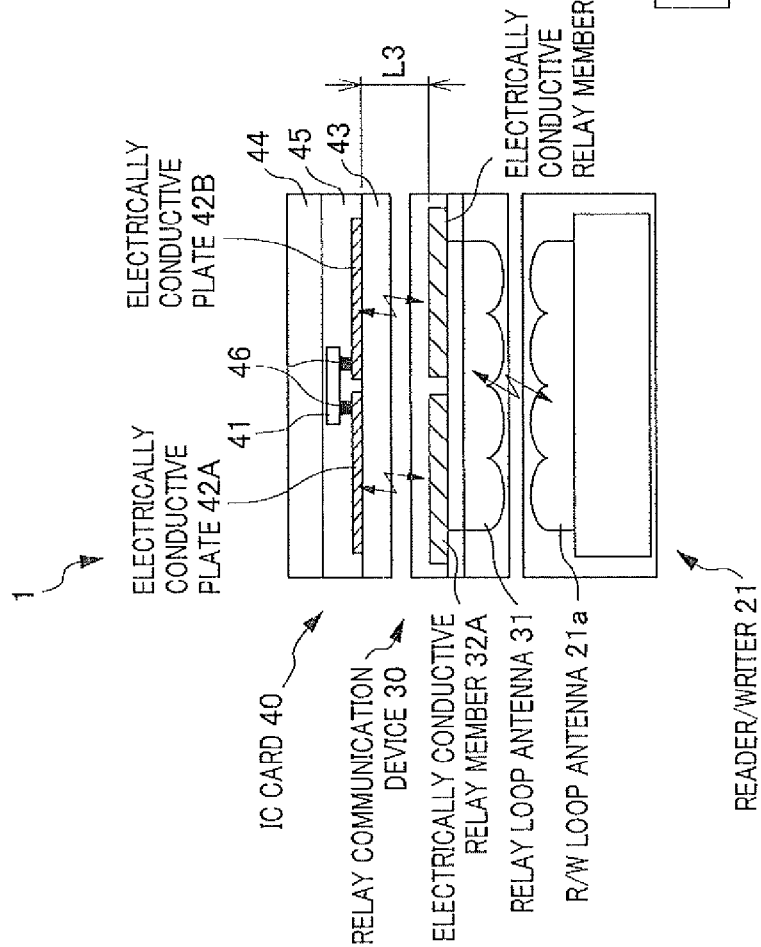
FIG. 11A
FIG. 11B

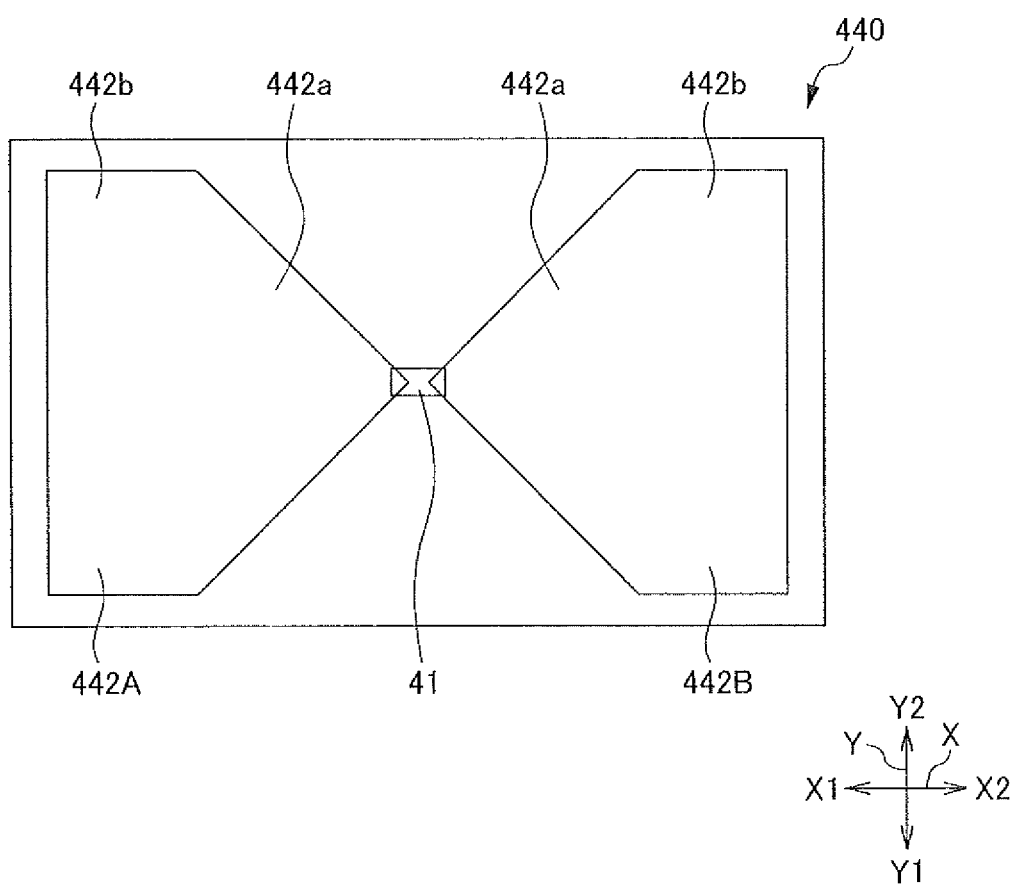

ELECTRICALLY CONDUCTIVE RELAY MEMBER
1232-0 (CONVENTIONAL)

ELECTRICALLY CONDUCTIVE RELAY MEMBER
1232-1 (NINTH EMBODIMENT)

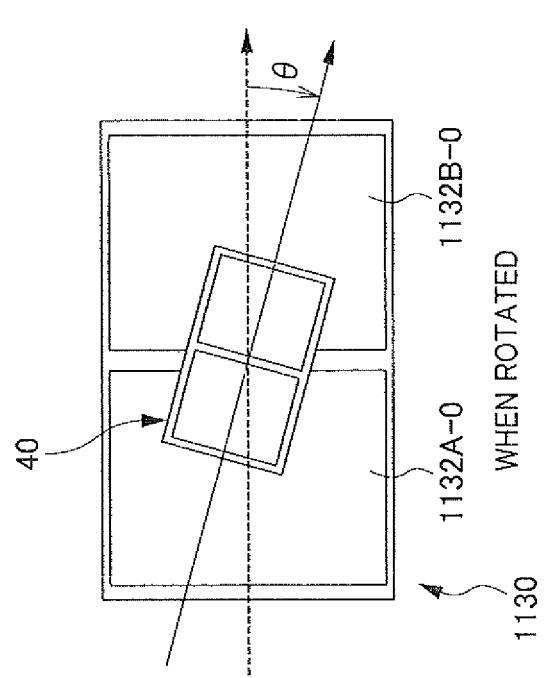
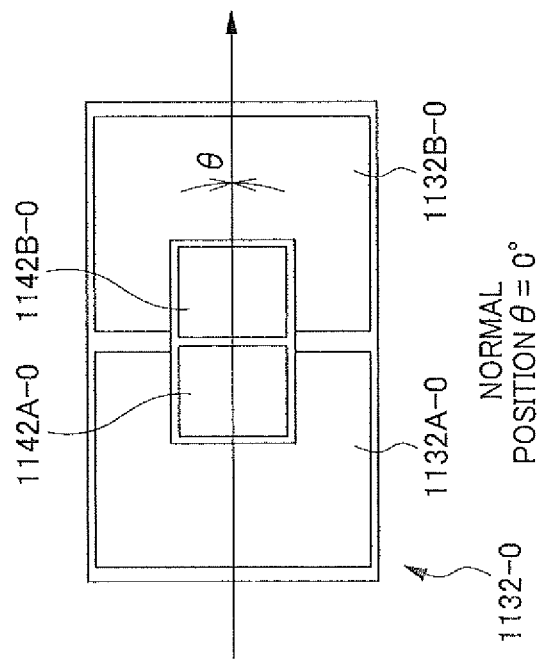

FIG. 27

TABLE 11 TEST RESULTS: COMMUNICABLE RANGE θ (deg)

|  | ELECTRICALLY CONDUCTIVE RELAY MEMBER 1132-0 (CONVENTIONAL) | ELECTRICALLY CONDUCTIVE RELAY MEMBER 1132-1 (NINTH EMBODIMENT) |
|---|---|---|
| IC CARD 1140-1 (CONVENTIONAL) | TOTAL:40<br>0~10<br>170~190<br>350~360 | TOTAL:300<br>0~75<br>105~255<br>285~360 |
| IC CARD 1140-1 (SECOND EMBODIMENT) | TOTAL:300<br>0~75<br>105~255<br>285~360 | TOTAL:180<br>0~45<br>135~225<br>315~360 |
| IC CARD 1140-2 (SIXTH EMBODIMENT) | TOTAL:330<br>0~75<br>90~255<br>270~360 | TOTAL:180<br>0~45<br>135~225<br>315~360 |

11a 11b 11c

11d

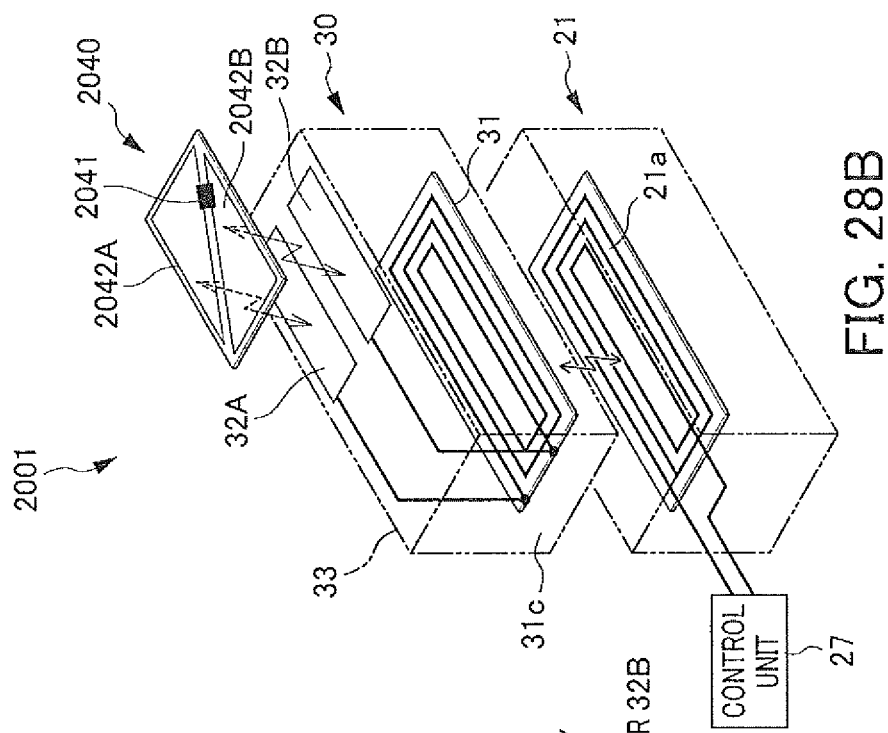
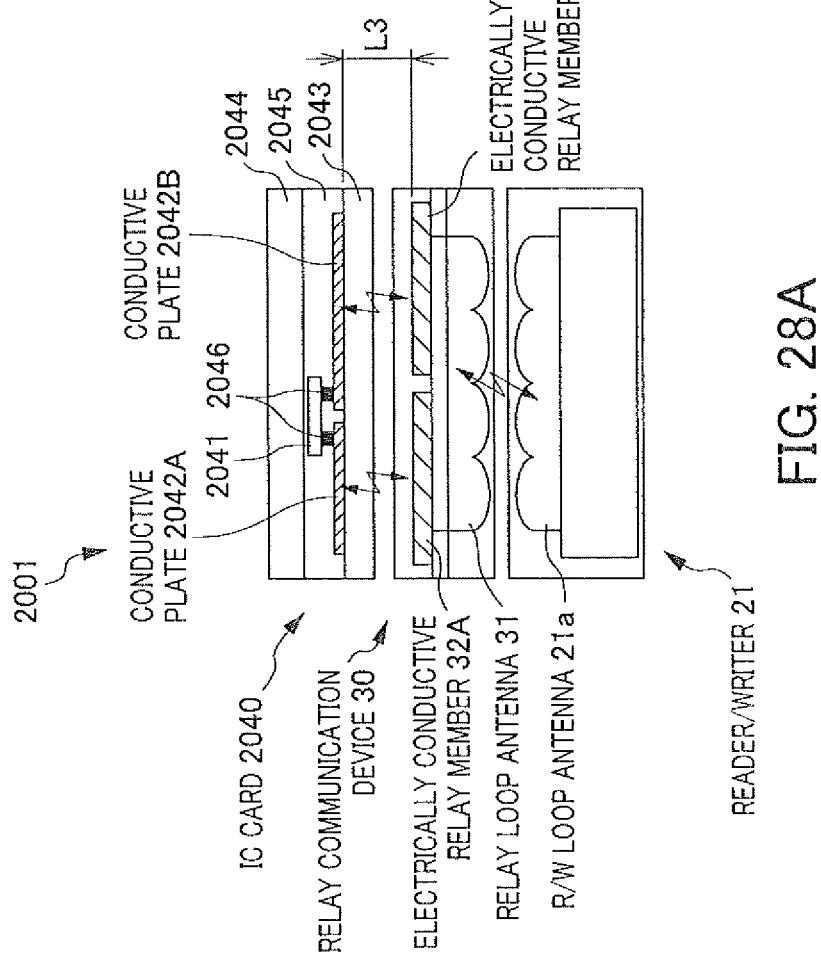
FIG. 28B
FIG. 28A

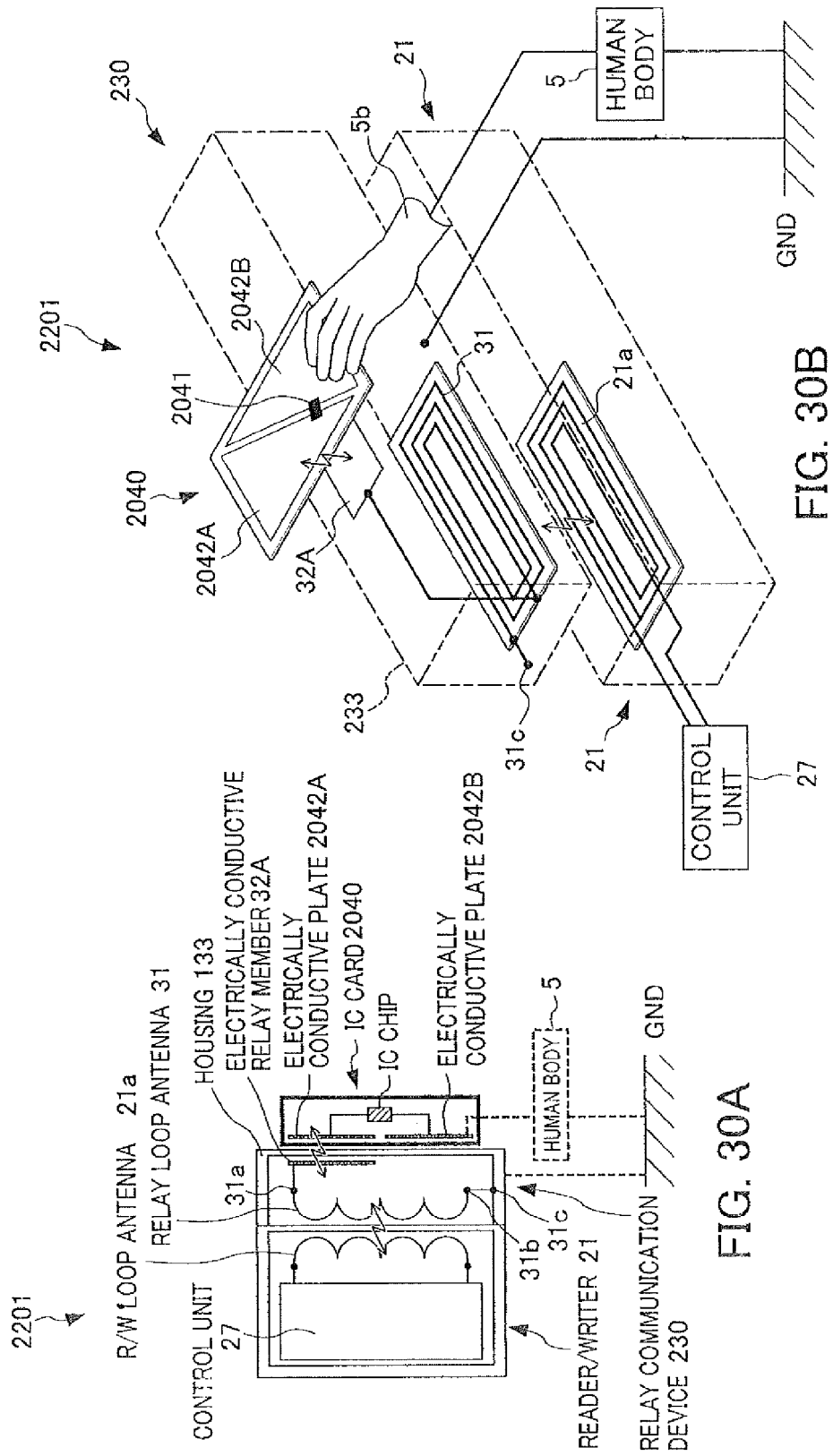

COMMUNICATION SYSTEM, INFORMATION RECORDING MEDIUM, AND RELAY COMMUNICATION DEVICE

CROSS-REFERENCE TO RELATED APPLICATIONS

This application is the national phase under 35 U.S.C. §371 of PCT International Application No. PCT/JP2011/063025, filed Jun. 7, 2011, which claims the benefit of Japanese Patent Application No. 2010-129734, filed Jun. 7, 2010, Japanese Patent Application No. 2011-112877, filed May 19, 2011, and Japanese Patent Application No. 2011-112879, filed May 19, 2011, the entire contents of the aforementioned applications are hereby incorporated herein by reference.

TECHNICAL FIELD

The present invention relates to a communication system that can employ a low cost information recording medium and can communicate through electromagnetic induction; an information recording medium; and a relay communication device.

BACKGROUND ART

In recent years, information recording media performing contactless communication with reading devices and, especially contactless IC cards, have been widely used in various systems such as transit systems, electronic money, employee ID card systems, logistics management, and the like.

Among communication methods employing contactless information recording media, there are the electromagnetic coupling method, electrostatic coupling method, electromagnetic induction method, and radio wave method depending on the communication frequency band. The electromagnetic induction method is used predominately in communication systems employing a contactless card.

Contactless IC cards using the electromagnetic coupling and electrostatic coupling are standardized by ISO/IEC 10536. The signal frequency of 4.9 MHz is used and two loop-shaped antennas or capacitor plates are provided within the contactless IC card.

Contactless IC cards using the electromagnetic induction are standardized by ISO/IEC 14443, 15693 and 18092. The signal frequency of 13.56 MHz is used and a loop-shaped antenna is provided in the contactless IC card.

Contactless IC cards using the radio wave method are standardized by ISO/IEC 18000. The signal frequency of 2.45 MHz is used and a plate-shaped dipole antenna is provided therein.

The contactless IC card communicates with an external terminal through an antenna connected to an IC chip equipped to the card. In order to obtain favorable communication performance, it is necessary to establish antenna shapes suited to the communication frequency and the IC chip.

As a result, the antenna may become a complex shape, and the quality of the antenna is secured by a method such as patterning by etching a conductive material, printing with a conductive ink, and embedding a coated wire. With these methods, it has been necessary to select a metal having a low resistance value and embody the antenna having the complex shape into a card in order to improve the communication characteristics. As a result, it has not been possible to reduce the card cost.

On the other hand, for a close-range type contactless communication system as a system that is inexpensively and simply configured and performs contactless communication of an electrostatic coupling method in a continuous, wide permissible range from low-speed data to high-speed data, a communication system has been offered. This system configures so as to use the electrostatic capacity formed by planar electrodes arranged on the transmitting side and receiving side respectively being made to face each other as a coupler. The transmitting side supplies a direct baseband signal to the electrode on the transmitting side. This system binarily demodulates the transmitted waveform reaching the electrode of the receiving side with a comparator having a hysteresis characteristic (for example, refer to Patent Document 1).

However, since the electromagnetic induction method is predominant in the communication system using a contactless information recording medium, in order to construct a system with the electrostatic coupling method described in Cited Publication 1, it is necessary to use an IC chip compatible with the electrostatic-coupling method and construct a system.

In addition, when an IC card of an electrostatic-coupling method is displaced or rotated relative to the reading device, there has been a problem in that the communication is not stable.

Furthermore, when the IC card of an electrostatic-coupling method and the aforementioned IC cards of an electromagnetic induction method are bent, there has been a problem in that the IC chip tends to be damaged.

Patent Document 1: Japanese Unexamined Patent Application, Publication No. 2009-135632

DISCLOSURE OF THE INVENTION

Problems to be Solved by the Invention

Therefore, the present invention has an object of providing a communication system that can employ a communication method according to an electromagnetic induction method and can employ a low-cost information recording medium; an information recording medium; and an relay communication device.

In addition, the present invention has an object of providing a communication system, an information recording medium, and a relay communication device, which improve the communication stability in a case of the information recording medium being displaced or rotated.

Furthermore, the present invention has an object of providing a communication system, an information recording medium, and a relay communication device, which implement high durability of IC chips to bending of the information recording medium.

Means for Solving the Problems

In a first aspect of the invention in order to achieve the object of the above-mentioned issues, a communication system includes an information recording medium, an electromagnetic induction communication device and a relay medium interposed between the information recording medium and the electromagnetic induction communication device. The system performs contactless communication between the information recording medium and the electromagnetic induction communication device through the relay medium. The information recording medium includes an IC chip configured for communication through electromagnetic induction and a first pair of electrically conductive plates connected to the IC chip. The relay medium includes a second pair of electrically conductive plates and a loop antenna. One of the second pair of electrically conductive plates is connected to a beginning end of the loop antenna, and the other of the second pair of electrically conductive plates is connected to a terminal end of the loop antenna. The electromagnetic induction communication device includes a loop antenna to perform communication with the information recording medium.

In a second aspect of the invention, the relay medium is integrated into the electromagnetic induction communication device in the communication system of the first aspect.

In a third aspect of the invention, the electromagnetic induction communication device communicates with the relay medium through electromagnetic induction and the relay medium communicates with the information recording medium through electrostatic coupling in the communication system of the first aspect or the second aspect.

In a fourth aspect of the invention, the second pair of electrically conductive plates provided to the relay medium communicates with the first pair of electrically conductive plates provided to the information recording medium in a state in which the first and the second pair of electrically conductive plates at least partially overlap each other, in the communication system according to any one of the first to third aspects.

In a fifth aspect of the invention, the second pair of electrically conductive plates provided to the relay medium and the first pair of electrically conductive plates provided to the information recording medium include different materials from each other, in the communication system according to any one of the first to third aspects.

In a sixth aspect of the invention, an information recording medium is provided, which is used in the communication system according to any one of the first to fifth aspects.

In a seventh aspect of the invention, the information recording medium according the sixth aspect is an IC card.

In an eighth aspect of the invention, the information recording medium according to the sixth aspect is an IC label.

In a ninth aspect of the invention, a communication system includes an information recording medium (40, 240, 340, 440, 540, 640, 740), an electromagnetic induction communication device (21), and a relay communication device (30) interposed between the information recording medium and the electromagnetic induction communication device. The system performs communication between the information recording medium and the electromagnetic induction communication device. The relay communication device includes a relay loop antenna (31) and a pair of electrically conductive relay members (32A, 32B) connected to both ends of the relay loop antenna and disposed across a slit. The electromagnetic induction communication device includes a communication loop antenna (21*a*) configured to communicate with the relay loop antenna through electromagnetic induction or electromagnetic coupling and a control unit (27) configured to perform communication processing with the information recording medium via the relay communication device. The information recording medium includes an IC chip (41) configured for communication through electromagnetic induction or electromagnetic coupling and a pair of electrically conductive plates (42A, 42B, 242A, 242B, 342A, 342B, 442A, 442B, 542A, 542B, 642A, 642B) that is disposed across and connected to the IC chip and electrostatically coupled to the pair of electrically conductive relay members of the relay communication device. Each of the pair of electrically conductive plates has one width on a side closer to the IC chip configured to be narrower than another width on an opposite side, when a top surface of the information recording medium is viewed from a normal direction, and is configured to permit at least one of displacement and rotation relative to the pair of electrically conductive relay members.

In a tenth aspect of the invention, an information recording medium (40, 240, 340, 440, 540, 640, 740) used in a communication system is provided. The communication system includes an electromagnetic induction communication device (21) and a relay communication device (30). The electromagnetic induction communication device includes a communication loop antenna (21*a*) configured to communicate through electromagnetic induction or electromagnetic coupling and a control unit (27) configured to perform communication processing via the communication loop antenna. The relay communication device includes a relay loop antenna (31) configured to communicate with the communication loop antenna through electromagnetic induction or electromagnetic coupling and a pair of electrically conductive relay members that is connected to both ends of the relay loop antenna and disposed across a slit. The information recording medium performs communication processing with the control unit of the electromagnetic induction communication device via the relay communication device. The information recording medium includes an IC chip (41) and a pair of electrically conductive plates (42A, 42B, 242A, 242B, 342A, 342B, 442A, 442B, 542A, 542B, 642A, 642B). The IC chip is configured for communication through electromagnetic induction or electromagnetic coupling. The pair of electrically conductive plates is disposed across and connected to the IC chip, and electrostatically coupled to the pair of electrically conductive relay members of the relay communication device. Each of the pair of electrically conductive plates has one width on a side closer to the IC chip configured to be narrower than another width on an opposite side, when a top surface of the information recording medium is viewed from a normal direction, and is configured to permit at least one of displacement and rotation relative to the pair of electrically conductive relay members.

In an eleventh aspect of the invention, a shape of each of the pair of electrically conductive plates (42A, 42B) on the side closer to the IC chip (41) is rectangular having a constant width, in the information recording medium according to the tenth aspect.

In a twelfth aspect of the invention, a shape of each of the pair of electrically conductive plates (242A, 242B, 342A, 342B, 442A, 442B, 542A, 542B, 642A, 642B) is substantially of a triangle, a width of which becomes narrower as the width approaches the side closer to the IC chip from the opposite side, in the information recording medium according to the tenth aspect.

In a thirteenth aspect of the invention, the width of each of the pair of electrically conductive plates (242A, 242B, 342A, 342B, 442A, 442B, 542A, 542B, 642A, 642B) narrows linearly at a constant ratio when the width approaches the side closer to the IC chip from the opposite side, in the information recording medium according to the twelfth aspect.

In a fourteenth aspect of the invention, an angle of the triangle on the side closer to the IC chip is no more than 30 degrees, in the information recording medium according to the thirteenth aspect.

In a fifteenth aspect of the invention, the shape of each of the pair of electrically conductive plates is curved so that a proportion by which the width of each of the pair of electrically conductive plates (542A, 532B) narrows becomes smaller as the width approaches the side closer to the IC chip from the opposite side, in the information recording medium according to the twelfth aspect.

In a sixteenth aspect of the invention, the pair of electrically conductive plates (42A, 42B, 242A, 242B, 342A, 342B, 442A, 442B, 542A, 542B, 642A, 642B) is disposed to be point symmetrical, in the information recording medium according to any one of the tenth to fifteenth aspects.

In a seventeenth aspect of the invention, a communication system includes an information recording medium (840), an electromagnetic induction communication device (21), and a relay communication device (30) interposed between the information recording medium and the electromagnetic induction communication device. The system performs communication between the information recording medium and the electromagnetic induction communication device. The relay communication device includes a relay loop antenna (31) and a pair of electrically conductive relay members (832A, 832B, 932A, 932B, 1032A, 1032B) that is connected to both ends of the relay loop antenna and disposed across a slit. The electromagnetic induction communication device includes a communication loop antenna (21a) configured to communicate with the relay loop antenna through electromagnetic induction or electromagnetic coupling and a control unit (27) configured to perform communication processing with the information recording medium via the relay communication device. The information recording medium includes an IC chip (41) configured for communication through electromagnetic induction or electromagnetic coupling and a pair of electrically conductive plates (842A, 842B) that is disposed across and connected to the IC chip and electrostatically coupled to the pair of electrically conductive relay members of the relay communication device. Each of the pair of electrically conductive relay members has one width on a side closer to the slit configured to be narrower than another width on an opposite side, when a top surface of the electromagnetic induction communication device is viewed from a normal direction, and is configured to permit at least one of displacement and rotation relative to the pair of electrically conductive plates.

In an eighteenth aspect of the invention, a relay communication device used in a communication system is provided. The communication system includes an electromagnetic induction communication device (21), the relay communication device and an information recording medium. The electromagnetic induction communication device includes a communication loop antenna (21a) and a control unit (27) configured to perform communication processing via the communication loop antenna. The relay communication device (830, 930, 1030) includes a relay loop antenna (31) configured to communicate with the communication loop antenna through electromagnetic induction or electromagnetic coupling and a pair of electrically conductive relay members (832A, 832B, 932A, 932B, 1032A, 1032B) that is connected to both ends of the relay loop antenna and disposed across a slit. The information recording medium (840) includes an IC chip (41) configured for communication through electromagnetic induction or electromagnetic coupling and a pair of electrically conductive plates (842A, 842B) that is disposed across and connected to the IC chip and electrostatically coupled to the pair of electrically conductive relay members of the relay communication device. The information recording medium performs communication processing with the control unit of the electromagnetic induction communication device via the relay communication device. Each of the pair of electrically conductive relay members has one width on a side closer to the slit configured to be narrower than another width on an opposite side, when a top surface of the relay communication device is viewed from a normal direction, and is configured to permit at least one of displacement and rotation relative to the pair of electrically conductive plates.

In a nineteenth aspect of the invention, a shape of each of the electrically conductive relay members (832A, 832B) on the side closer to the slit is rectangular having a constant width, in the relay communication device according to the eighteenth aspect.

In a twentieth aspect of the invention, a shape of each of the electrically conductive relay members (932A, 932B, 1032A, 1032B) is substantially of a triangle, a width of which becomes narrower as the width approaches the side closer to the slit from the opposite side, in the relay communication device according to the eighteenth aspect.

In a twenty-first aspect of the invention, the width of each of the electrically conductive relay members (932A, 932B) narrows linearly at a constant ratio when the width approaches the side closer to the slit from the opposite side, in the relay communication device according to the twentieth aspect.

In a twenty-second aspect of the invention, an angle of the triangle on the side closer to the slit is no more than 30 degrees in the relay communication device according to the twenty-first aspect.

In a twenty-third aspect of the invention, the shape of each of the pair of electrically conductive plates is curved so that a proportion by which the width of each of the pair of electrically conductive relay members (1032A, 1032B) narrows becomes smaller as the width approaches the side closer to the slit from the opposite side, in the relay communication device according to the nineteenth aspect.

In a twenty-fourth aspect of the invention, the pair of electrically conductive relay members (832A, 832B, 932A, 932B, 1032A, 1032B) is disposed to be point symmetrical in the relay communication device according to any one of the seventeenth to twenty-third aspects.

In a twenty-fifth aspect of the invention, a communication system includes an information recording medium (2040, 2140, 2240, 2340), an electromagnetic induction communication device (21) and a relay communication medium (30, 130, 230) interposed between the information recording medium and the electromagnetic induction communication device. The communication system performs communication between the information recording medium and the electromagnetic induction communication device. The relay communication medium includes a relay loop antenna (31) and at least one electrically conductive relay member (32A) connected to at least one end of the relay loop antenna. The electromagnetic induction communication device includes a communication loop antenna (21a) configured to communicate with the relay loop antenna through electromagnetic induction and a control unit (27) configured to perform communication processing with the information recording medium via the relay communication medium. The information recording medium includes an IC chip (2041) configured for communication through electromagnetic induction or electromagnetic coupling and a pair of electrically conductive plates (2042A, 2042B, 2142A, 2142B, 2242A, 2242B, 2342A, 2342B) disposed across a slit and connected to the IC chip. One of the pair of electrically conductive plates is electrostatically coupled to the electrically conductive relay member connected to one end of the relay loop antenna and the other is electrically connected to the other end. A shape of a top surface of the information recording medium viewed from a normal direction is rectangular or square. The IC chip is disposed on a portion of the slit (2040A, 2140a, 2240a, 2340a) that does not coincide with a first center line (CL1, CL201) and a second center line (CL2, CL202), where the first center line is parallel to a first side of the information recording medium and the second center line is parallel to a second side orthogonal to the first side.

In a twenty-sixth aspect of the invention, an information recording medium (2040, 2140, 2240, 2340) used in a communication system is provided. The communication system includes an electromagnetic induction communication device (21) and a relay communication medium (30, 130, 230). The electromagnetic induction communication device includes a communication loop antenna (21a) configured to communicate through electromagnetic induction or electromagnetic coupling and a control unit (27) configured to perform communication processing via the communication loop antenna. The relay communication medium includes a relay loop antenna (31) configured to communicate with the communication loop antenna through electromagnetic induction or electromagnetic coupling and at least an electrically conductive relay member (32A) connected to at least an end of the relay loop antenna. The information recording medium performs communication processing with the control unit of the electromagnetic induction communication device via the relay communication medium. The information recording medium includes an IC chip (2041) configured for communication through electromagnetic induction or electromagnetic coupling and a pair of electrically conductive plates (2042A, 2042B, 2142A, 2142B, 2242A, 2242B, 2342A, 2342B) that is connected to the IC chip and disposed across a slit. One of the pair of electrically conductive plates is electrostatically connected to the electrically conductive relay member connected to one end of the relay loop antenna, and the other is electrically connected to the other end. A shape of a top surface of the information recording medium viewed from a normal direction is rectangular or square. The IC chip is disposed on a portion of the slit (2040A, 2140a, 2240a, 2340a) that does not coincide with a first center line (CL1, CL201) and a second center line (CL2, CL202), where the first center line is parallel to a first side of the information recording medium and the second center line is parallel to a second side orthogonal to the first side.

In a twenty-seventh aspect of the invention, the pair of electrically conductive plates (2042A, 2042B, 2142A, 2142B, 2242A, 2242B, 2342A, 2342B) is provided over substantially an entire region of the information recording medium when the top surface of the information recording medium is viewed from the normal direction, in the information recording medium according to the twenty-sixth aspect.

In a twenty-eighth aspect of the invention, the slit (2040a) is provided on a diagonal line (2040c) when the top surface of the information recording medium is viewed from the normal direction, in the information recording medium according to the twenty-sixth or twenty-seventh aspect.

In a twenty-ninth of the invention, the slit (2040A, 2140a, 2240a, 2340a) includes one portion (2240a-1, 2340a-1) on the first center line (CL201, CL302) and the other portion (2240a-3, 2340a-3) in which the IC chip (2041) is disposed, when the top surface of the information recording medium is viewed from the normal direction. The other portion is connected stepwise to the one portion on the first center line and does not coincide with the first center line and the second centerline, in the information recording medium according to twenty-sixth or twenty-seventh aspect.

In a thirtieth aspect of the invention, the pair of electrically conductive plates (2042A, 2042B, 2142A, 2142B, 2242A, 2242B, 2342A, 2342B) is point symmetrical relative to a center (2040b, 2240b) of the information recording medium when the top surface of the information recording medium is viewed from the normal direction, in the information recording medium according to any one of the twenty-sixth to twenty-ninth aspects.

In a thirty-first aspect of the invention, the IC chip (2041) has a shape of a cube or a rectangular solid and a direction of a central axis (2041a, 2041b) of the cube or the rectangular solid when the top surface of the information recording medium is viewed from the normal direction is sloped relative to the first center line (CL1, CL201) and the second center line (CL2, CL202), in the information recording medium according to any one of the twenty-sixth to thirtieth aspects.

Effects of the Invention

According to the communication system of the present invention, since a so-called antenna is not equipped to the information recording medium and only two electrically conductive thin plates are equipped thereto, it is possible to eliminate a conventional complex antenna formation process and to manufacture the information recording medium at low cost.

In addition, the following effects can be exerted according to the ninth to twenty-fourth aspects of the invention.

In the ninth and tenth aspects of the invention, the communication loop antenna communicates with the relay loop antenna through electromagnetic induction. The pair of electrically conductive relay members of the relay loop antenna is electrostatically coupled with the pair of electrically conductive plates of the information recording medium. Accordingly, the driving power is supplied to the information recording medium, while the electromagnetic wave signal emanating from the electromagnetic induction communication device is transmitted to the information recording medium. In this manner, the control unit of the electromagnetic induction communication device can perform communication processing with the IC chip of the information recording medium.

In addition, since it is not necessary to form a loop antenna in the information recording medium and it is sufficient to provided two electrically conductive plates, a complex antenna formation process becomes unnecessary, and it is possible to manufacture the information recording medium at low cost. As a result, as the amount of issued information recording media increases, it becomes more advantageous in a cost perspective compared to conventional systems, and it is possible to construct a system at low cost.

Furthermore, since it is possible to construct a system by appropriating an electromagnetic induction communication device of electromagnetic induction that is widely distributed in the market, it can be introduced at low cost. In other words, as the IC chip of the information recording medium, an IC chip used in existing contactless IC cards of electromagnetic induction that are widely distributed in the market can be appropriated, and as the electromagnetic induction communication device, a device can be configured by appropriating an existing reader/writer for contactless IC cards. It is thereby possible to construct a system without newly developing a special IC chip of electrostatic coupling and a reader/writer.

Furthermore, since it is also sufficient to provide a pair of electrically conductive plates to the information recording medium, the external form of the information recording medium can be decreased in size when compared to a case of providing a loop antenna to the information recording medium. It is thereby possible to manufacture the information recording medium at lower cost.

Moreover, since the width of each of the pair of electrically conductive plates on a side closer to an IC chip has a portion narrower than the width on an opposite side, it is possible to permit displacement or rotation of each of the pair of electrically conductive plates relative to the pair of electrically conductive relay members. When a user uses the information recording medium by holding it over the pair of electrically conductive relay members, it is possible to establish communication between the pair of electrically conductive plates and the pair of electrically conductive relay members even if the arrangement of the information recording medium relative to the pair of electrically conductive relay members is shifted or rotated from a reference position. As a result, it is possible to improve the tolerance to displacement or rotation relative to the pair of electrically conductive relay members during use of the information recording medium.

According to the eleventh aspect of the invention, it is possible to remarkably increase the tolerance to displacement, since the shape of each of the pair of electrically conductive plates on the side closer to the IC chip is rectangular with a constant width.

According to the twelfth aspect of the invention, it is possible to remarkably increase tolerance to rotation, since the shape of each of the pair of electrically conductive plates on the side closer to the IC chip is a substantially triangular shape in which the width of each of the pair of electrically conductive plates narrows when the width approaches the IC chip from the opposite side.

According to the thirteenth aspect of the invention, it is possible to remarkably increase tolerance to rotation, since the external form of each of the pair of electrically conductive plates on the side closer to the IC chip is linear and electrostatic coupling with another electrically conductive relay member will not occur so long as the linear portion does not exceed the slit of the pair of electrically conductive relay members during rotation.

According to the fourteenth aspect of the invention, it is possible to remarkably increase the tolerance to rotation and drastically increase the communicable rotation positions, since the angle of the substantially triangular shape on the side closer to the IC chip is no more than 30 degrees.

According to the fifteenth aspect of the invention, it is possible to increase the tolerance to both shift and rotation in proper balance, since the external form of each of the pair of electrically conductive plates on the side closer to the IC chip is a curved form in which a proportion by which the width of each of the pair of electrically conductive plates narrows becomes smaller when the width approaches the IC chip from an opposite side.

According to the sixteenth aspect of the invention, it is possible to avoid a system vulnerable to rotation in a certain direction, since the pair of electrically conductive plates is disposed to be point symmetrical. Due to the point symmetry, an area of each of the pair of conductive plates is the same and stable electrostatic coupling is implemented. In addition, the angular margin (rotational tolerance) until one of the pair of electrically conductive plates penetrates the other one of the pair of electrically conductive relay members is the same irrespective of the direction of rotation.

In addition, even in a case of one of the pair of electrically conductive plates having penetrated the other one of the pair of electrically conductive relay members, one area by which the one electrically conductive plate penetrates the other electrically conductive relay member and another area by which the other electrically conductive plate penetrates one electrically conductive relay member would be the same. Accordingly, a good balance is realized between the extent to which the one electrically conductive plate is electrostatically coupled with the one electrically conductive relay member and the extent to which the other electrically conductive plate is electrostatically coupled with the other electrically conductive relay member. In this manner, it is possible to avoid a system vulnerable to rotation in a certain direction so that the system maintains favorable communication.

According to the seventeenth and eighteenth aspects of the invention, it is possible to exert similar effects to the above ninth and tenth aspects, since the width of the pair of electrically conductive relay members on the side closer to the slit has a portion narrower than the width on an opposite side, and permits displacement or rotation of the pair of electrically conductive relay members relative to the pair of electrically conductive plates.

According to the nineteenth aspect of the invention, it is possible to exert similar effects to the above eleventh aspect of the invention, since the shape of the pair of electrically conductive relay members on the side closer to the slit is rectangular with a constant width.

According to the twentieth aspect of the invention, it is possible to exert similar effects to the above twelfth aspect, since the shape of each of the pair of electrically conductive relay members on the side closer to the slit is a substantially triangular shape in which the width of each of the pair of electrically conductive relay members narrows when the width approaches the slit from an opposite side.

According to the twenty-first aspect of the invention, it is possible to exert similar effects to the above thirteenth aspect, since the external form of each of the pair of electrically conductive relay members on the side closer to the slit is linear.

According to the twenty-second aspect of the invention, it is possible to exert similar effects to the above fourteenth aspect, since the angle of the substantially triangular shape on the side closer to the IC chip is no more than 30 degrees.

According to the twenty-third aspect of the invention, it is possible to exert similar effects to the above fifteenth aspect, since the external form of each of the pair of electrically conductive relay members on the side closer to the slit is a curved form in which a proportion by which the width of each of the pair of electrically conductive relay members narrows becomes smaller when the width approaches the slit from an opposite side.

According to the twenty-fourth aspect of the invention, it is possible to exert similar effects to the above sixteenth aspect, since the pair of electrically conductive relay members is disposed to be point symmetrical.

Furthermore, it is possible to exert the following effects according to the twenty-fifth to thirty-first aspects of the invention.

According to the twenty-fifth and twenty-sixth aspects of the invention, the communication loop antenna communicates with the relay loop antenna by electromagnetic induction. The electrically conductive relay member at one end of the relay loop antenna is electrostatically coupled with one electrically conductive plate of the information recording medium. The other end of the relay loop antenna is electrically connected to the other electrically conductive plate of the information recording medium. Accordingly, the drive power is supplied to the information recording medium, and the electromagnetic wave signal emanated from the electromagnetic induction communication device is transmitted to the information recording medium. In this manner, the control unit of the electromagnetic induction communication device performs communication processing with the IC chip of the information recording medium.

In addition, since it is not necessary to form a loop antenna in the information recording medium and it is sufficient to provided two electrically conductive plates, it is possible to eliminate a complex antenna formation process and manufacture the information recording medium at low cost. As a result, as the amount of issued information recording media increases, it becomes more advantageous in a cost perspective compared to conventional systems, and it is possible to construct a system at low cost.

Furthermore, since it is possible to construct a system by appropriating an electromagnetic induction communication device of electromagnetic induction that is widely distributed in the market, it can be introduced at low cost. In other words, as the IC chip of the information recording medium, an IC chip used in existing contactless IC cards of electromagnetic induction method that are widely distributed in the market can be appropriated, and as the electromagnetic induction communication device, a device can be configured by appropriating an existing reader/writer for contactless IC cards. It is thereby possible to construct a system without newly developing a special IC chip of electrostatic coupling and a reader/writer.

Furthermore, since it is also sufficient to provide a pair of electrically conductive plates to the information recording medium, it is possible to decrease the external form of the information recording medium in size when compared to a case of providing a loop antenna to the information recording medium. It is thereby possible to manufacture the information recording medium at lower cost.

In addition, the slit has a portion not overlapping with the first center line and the second center line, and the IC chip is arranged in this not overlapping portion. Herein, with a card-like form such as that of an information recording medium, when it is folded, the most stress tends to act on the first center line and the second center line, and it tends to curve along them. The present invention suppresses damage to the IC chip and increases the durability of the IC chip to bending of the information recording medium, by providing the IC chip in a region different from this first center line and second center line.

According to the twenty-seventh aspect of the invention, it is possible to increase the installation region, since the pair of electrically conductive plates is provided to substantially the entire region of the information recording medium so as to establish stable communication processing.

According to the twenty-eighth aspect of the invention, since the slit is provided on a diagonal line of the information recording medium, it is sufficient to traverse a cutting tool along the diagonal line when forming the pair of electrically conductive plates. Accordingly, it is possible to render manufacturing to be simple and dramatically reduce cost.

According to the twenty-ninth aspect of the invention, it is possible to increase the degrees of freedom in the arrangement of the IC chip since the slit has a portion on the first center line and a portion on which the IC chip is disposed and connected stepwise to the portion on the first center line, not overlapping with the first center line and second center line. In addition, it is possible to increase the tolerance of the IC chip disposed on the slit since the slit is made stepwise so that folding at the slit portion does not occur easily.

According to the thirtieth aspect of the invention, it is possible to suppress variation in the reception of the electrostatic coupling accompanying differences in the orientation of the information recording medium since the pair of electrically conductive plates is point symmetrical relative to the center of the information recording medium, the pair of conductive plates can be disposed in proper balance, and the areas of the pair of electrically conductive plates can be made the same.

According to the thirty-first aspect of the invention, the IC chip is a cube or a rectangular solid and the direction of the central axis thereof is sloped relative to the first center line and the second center line on which stress tends to act. Accordingly, the stress acting on the IC chip acts in a direction for which the rigidity of the IC chip is strong when the information recording medium is bent. In this manner, it is possible to further prevent damage of the IC chip.

BRIEF DESCRIPTION OF THE DRAWINGS

FIG. 11 is a view illustrating a communication method of a communication system 1 of a second embodiment;

FIG. 17 is a plan view of an IC card 440 of a fifth embodiment;

FIGS. 26A and 26B are plan views illustrating a test method of validation tests;

FIG. 27 is a table showing results of the validation tests;

FIGS. 28A and 28B are diagrams illustrating a communication method of a communication system 2001 of a twelfth embodiment;

FIGS. 30A and 30B are diagrams illustrating a communication system 2201 employing another communication method of the twelfth embodiment;

Figure 1:
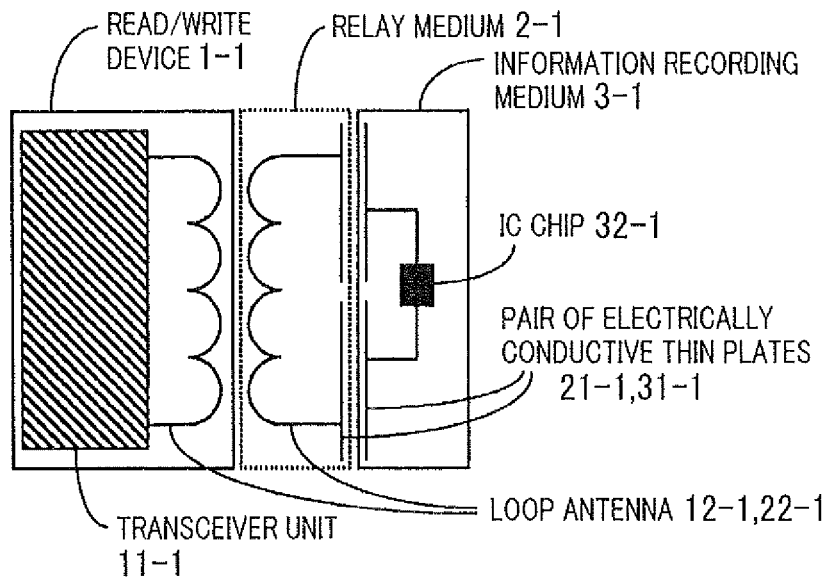
FIG. 1 is an example of a circuit diagram illustrating a communication system of a first embodiment.

EXPLANATION OF REFERENCE NUMERALS 1-1 read/write device (reader/writer)
2-1 relay medium
3-1 information recording medium (IC card, IC label)
4-1 printing ink
11-1 transceiver unit
12-1, 22-1 loop antenna
20-1 relay medium substrate
21-1, 31-1 a pair of electrically conductive thin plates
23-1 capacitor
30-1 information recording medium substrate
32-1 IC chip
33-1 encapsulation resin
34-1 conductive binder
35-1 gluing agent
36-1 release paper
300-1 multifaceted electrically conductive thin plate
311-1 support film for electrically conductive thin plate
312-1 electrically conductive thin plate
314-1 line without electrically conductive thin plate
1 communication system
21 reader/writer
21a R/W loop antenna
27 control unit
30, 830, 930, 1030 relay communication device
30a slit
31 relay loop antenna
32A, 32B, 832A, 823B, 932A, 923B, 1032A, 1032B electrically conductive relay member
40, 240, 340, 440, 540, 640, 740, 840 IC card
41 IC chip
42A, 42B, 242A, 242B, 342A, 342B, 442A, 442B, 542A, 542B, 642A, 642B, 842A, 842B electrically conductive plate
2001, 2101, 2201 communication system
240, 2140, 2240, 2340 IC card
2040a, 2140a, 2240a, 2340a slit
2040b, 2240b center
2040c, 2140c diagonal line
2041 IC chip
2042A, 2042B, 2142A, 2142B, 2224A, 2242B, 2342A, 2342B electrically conductive plate
2240a-1 portion on horizontal center line
2240a-2, 2240a-3 vertical portion
2340a-1 portion on vertical center line
2340a-2, 2340a-3 horizontal portion
CL1, CL201 horizontal center line
CL2, CL202 vertical center line

PREFERRED MODE FOR CARRYING OUT THE INVENTION

Hereinafter, a communication system and information recording medium used therein of the present embodiment will be explained while referring to the drawings.

FIG. 1 is a view showing the concept of a communication system of a first embodiment that contactlessly communicates between an information recording medium and read/write device (electromagnetic induction communication device) by interposing a relay medium therebetween.

An information recording medium 3-1 includes an IC chip 32-1, and a pair of electrically conductive thin plates 31-1 connected to the IC chip 32-1. A relay medium 2-1 is equipped with a pair of electrically conductive thin plates 21-1 facing the pair of electrically conductive thin plates 31-1 formed in the information recording medium 3-1 and a loop antenna 22-1.

One of the electrically conductive thin plates 21-1 is connected to a beginning end of the loop antenna 22-1, and the other one of the electrically conductive thin plates 21-1 is connected to a terminal end of the loop antenna 22-1.

A read/write device 1-1 has a loop antenna 12-1 that is close to the loop antenna 22-1 provided to the relay medium 2-1.

The read/write device 1-1 and the relay medium 2-1 transfer signals through electromagnetic induction when the loop antenna 12-1 and loop antenna 22-1 are brought close to each other. The relay medium 2-1 and information recording medium 3-1 transfer signals through electrostatic coupling that is established by the pairs of electrically conductive thin plates 21-1 and 31-1 that are made to face each other. Accordingly, it is possible to perform communication between the read/write device 1-1 and the information recording medium 3-1.

The relay medium 2-1 may be integrated into the read/write device 1-1.

Figure 2:
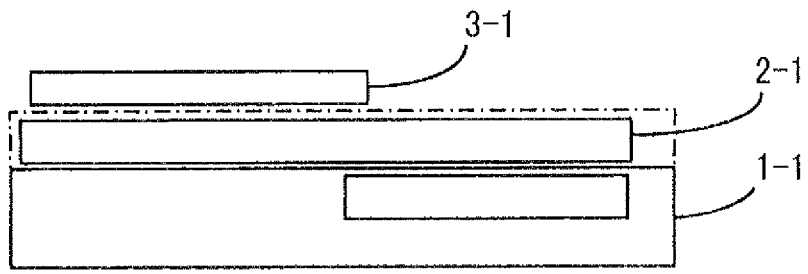
FIG. 2 is a view illustrating an example of a read/write device used in the communication system of the first embodiment.
Figure 4:
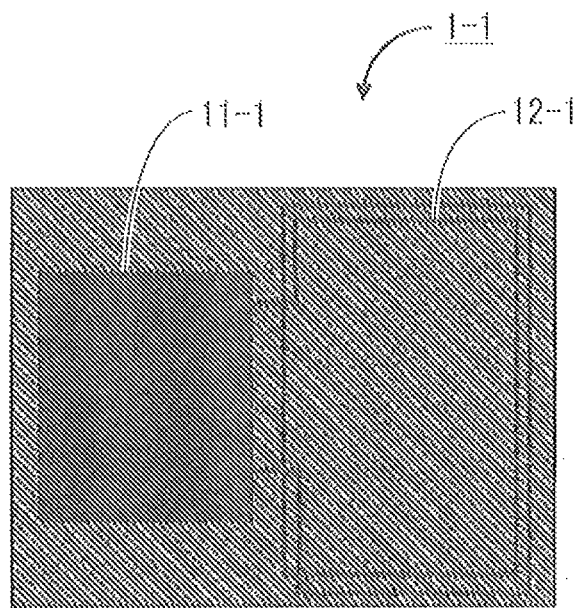
FIG. 4 is a view illustrating an example of a transceiver unit and antenna of the read/write device of the first embodiment.

FIG. 2 shows the relay medium 2-1 of the first embodiment being attached outside of the read/write device 1-1, and the information recording medium 3-1 is placed on the relay medium 2-1 so as to be read. FIG. 2 is an example of a case in which the pair of electrically conductive thin plates and the loop antenna are formed on the same side of a substrate of the relay medium 2-1. The pair of electrically conductive thin plates is formed on left side and the loop antenna is formed on the right side of the relay medium 2-1. It is configured so that the pair of electrically conductive thin plates of the relay medium 2-1 faces the pair of electrically conductive thin plates equipped in the information recording medium 3-1, and the loop antenna of the relay medium 2-1 faces the loop antenna 12-1 of the read/write device 1-1 as shown in FIG. 4.

The relay medium 2-1 may be fixed by an adhesive or the like to the read/write device 1-1, or may be fixed by a cord or the like.

Figure 3:
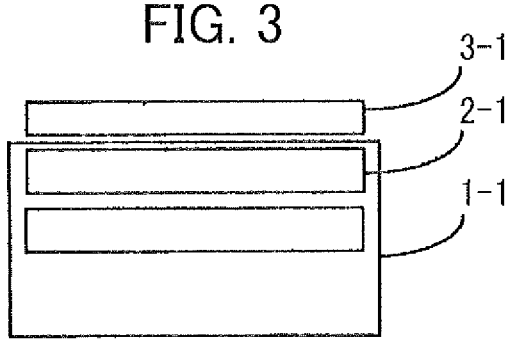
FIG. 3 is a view illustrating an example of a read/write device used in the communication system of the first embodiment.

In addition, as shown in FIG. 3, the relay medium 2-1 may be integrated inside of a housing of the read/write device 1-1.

Figure 5:
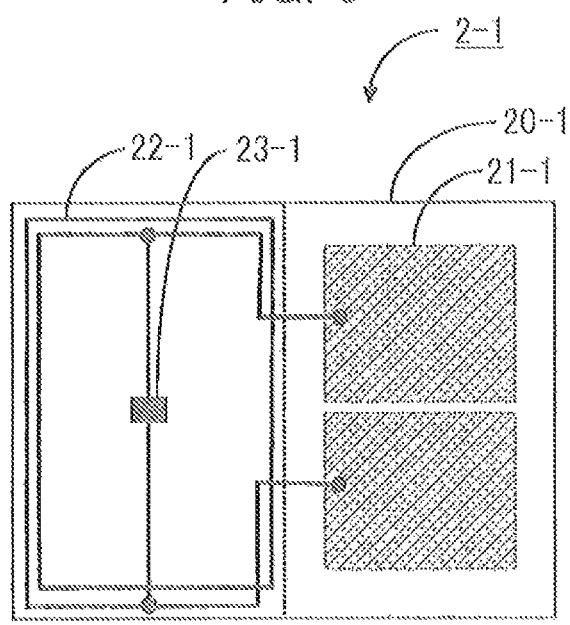
FIG. 5 is a schematic diagram illustrating an example of a relay medium of the first embodiment.

In an example shown in FIG. 3, a relay medium substrate 20-1 is folded to about the same size as the information recording medium 3-1 at the dotted-line position at the center of a long side of the relay medium 2-1 shown in FIG. 5, and integrated inside of the housing of the read/write device 1-1.

It is configured so that the pair of electrically conductive thin plates of the relay medium 2-1 faces the pair of electrically conductive thin plates equipped in the information recording medium 3-1, and the loop antenna of the relay medium 2-1 faces the loop antenna of the read/write device 1-1.

In the case of the read/write device 1-1 shown in FIG. 3, the information recording medium 3-1 is placed at a predetermined position on the read/write device 1-1 and the recorded information is read. It may alternatively be possible that an upper part of the relay medium 2-1 of FIG. 3 is integrated with the read/write device 1-1 to be a tunnel structure, where the information recording medium 3-1 drops down on its own weight and stops at a predetermined position so that the recorded information is read and new information is written.

In the case of the information recording medium 3-1 being a contactless IC card, it may alternatively be possible that a card transport mechanism is provided to the read/write device 1-1 into which the relay medium 2-1 is integrated as shown in FIG. 3, the card is made to move to a predetermined position so that the recorded information is read or written, and the card is automatically ejected.

Figure 9:
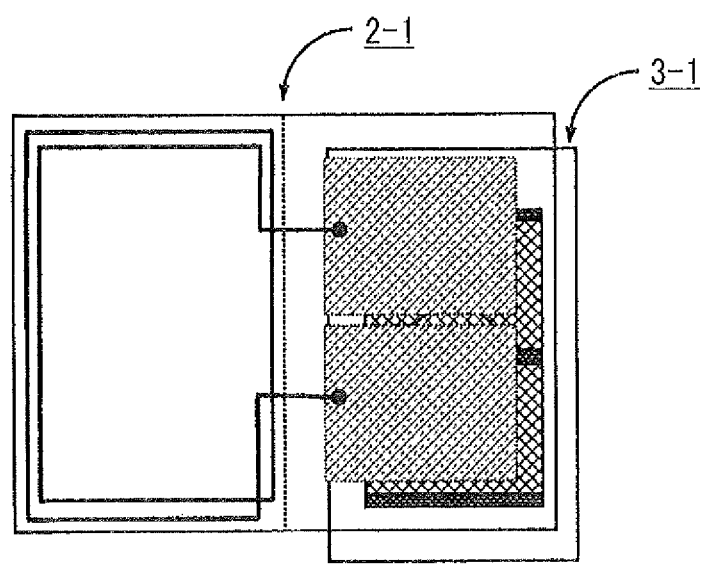
FIG. 9 is a schematic diagram illustrating an example of an aspect in which the information recording medium of the first embodiment is read via the relay media.

When contact-type IC cards (also referred to as a IC card with terminals), or contact/contactless dual-use-type IC cards are handled, it is necessary to provide positioning with high precision for the read/write device. On the other hand, the information recording medium 3-1 of the present embodiment enables reading even if there is some shift as shown in FIG. 9. As a result, it is possible to produce and provide a read/write device at low cost.

The read/write device 1-1 shown in FIG. 4 is an example in which the loop antenna 12-1 and a transceiver unit 11-1 are separately arranged. However, there is no necessity to read in a state in which there is perfect overlap between the pair of electrically conductive thin plates provided in the relay medium and the pair of electrically conductive thin plates provided in the information recording medium, as illustrated in FIG. 9.

So long as there is a portion of a predetermined area at which the pair of electrically conductive thin plates provided to the relay medium and the pair of electrically conductive thin plates provided to the information recording medium overlap each other, it is possible to communicate between the relay medium and the information recording medium.

Although it is more preferable for the pair of electrically conductive thin plates provided to the aforementioned relay medium and the pair of electrically conductive thin plates provided to the information recording medium to be the same material, e.g., good conductors of electricity such as aluminum, copper, brass, tin, zinc, silver or gold, they may be configured by different materials.

Particularly for the information recording medium, it is preferable to use aluminum as the material of the pair of electrically conductive thin plates. This is because it is possible to provide an information recording medium at lower cost since aluminum is less expensive compared to other metals.

The information recording medium 3-1 will be explained while referring to FIGS. 6 and 7.

Figure 6A:
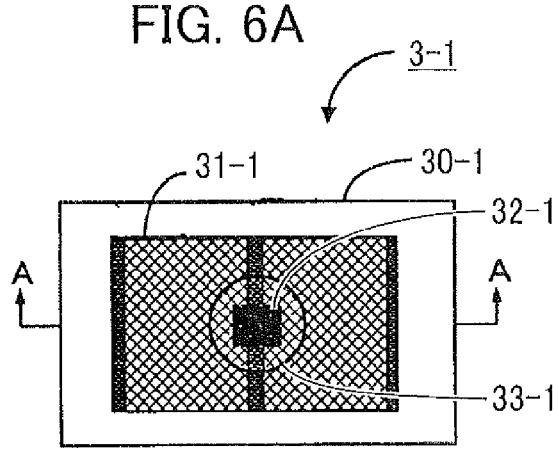
FIG. 6 is a perspective view illustrating an example of an information recording medium of the first embodiment.
Figure 7:
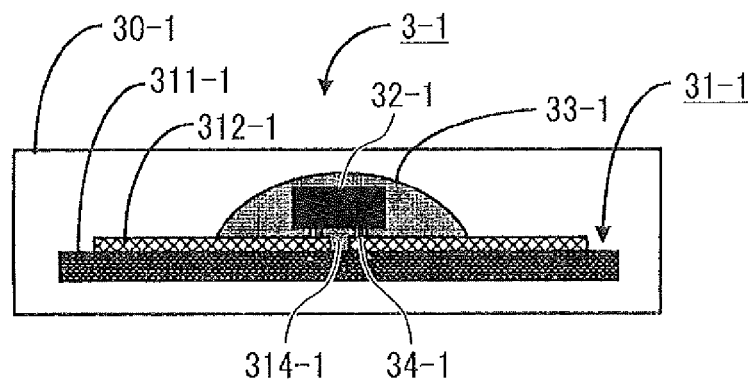
FIG. 7 is an examples of a cross-section along the line A-A in FIG. 6.

FIG. 6A is a transparent plan view of the information recording medium 3-1 of the first embodiment.

A pair of electrically conductive thin plates 31-1 having an IC chip 32-1 is fixed midway in a thickness direction to an information recording medium substrate 30-1.

In the pair of electrically conductive thin plates 31-1, electrically conductive thin plates 312-1 of metal or the like are bonded with adhesive or the like onto a support film 311-1 made of electrical insulation material for supporting electrically conductive thin plates.

The IC chip 32-1 is connected to the respective electrically conductive thin plates 31-1 at antenna connection terminals (not illustrated) formed in the chip, straddling a center boundary part of the pair of electrically conductive thin plates 31-1 (linear portion in which the electrically conductive thin plate is not formed). The antenna connection terminals of the IC chip 32-1 and the electrically conductive thin plates 31-1 are fixed with a conductive projection, an anisotropically-conductive film, a conductive adhesive such as a conductive paste, or the like.

Figure 6B:
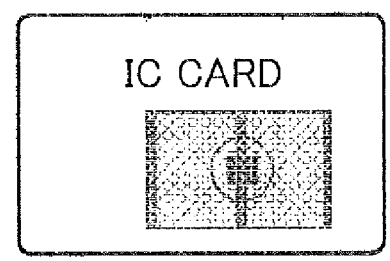

FIG. 6B is an IC card used in the communication system of the first embodiment.

Inside of a plastic support made from an electrical insulation material, the IC card has built-in the aforementioned IC chip and the pair of electrically conductive thin plates (also referred to as module in the case of an IC card) joined with the IC chip.

A magnetic stripe for magnetic recording may be formed on the surface of the IC card.

In addition, visually appealing printing is conducted on both sides. In the present embodiment, the IC chip 32-1 formed in the boundary portion of the pair of electrically conductive thin plates 31-1 as shown in FIG. 6A is coated by an encapsulation resin 33-1 to be reinforced.

Figure 8:
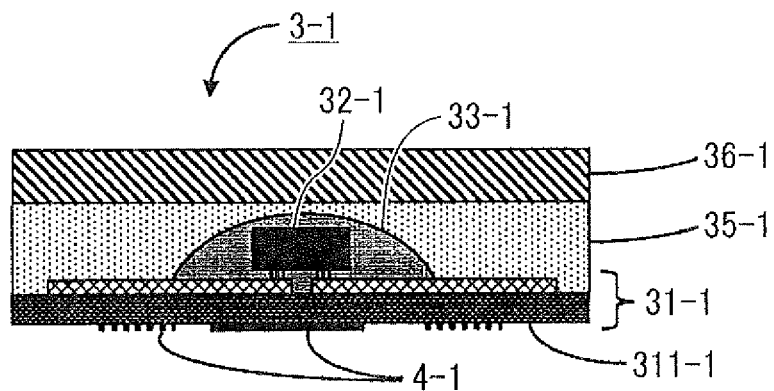
FIG. 8 is another example of a cross-section along the line A-A in FIG. 6.

FIG. 8 is a diagram showing an example of a cross-section in a case of the information recording medium 3-1 of the first embodiment being an IC label.

In an example shown in FIG. 8, an adhesion layer is formed by way of a gluing agent 35-1 on a surface of the pair of electrically conductive thin plates 31-1 on which the IC chip 32-1 is mounted, and a release paper 36-1 is formed in order to protect the adhesion layer.

In addition, printing is conducted on an exposed surface of the support film 311-1 for the pair of electrically conductive thin plates 31-1, and printing ink 4-1 is exposed.

In the case of the present embodiment, a non-transparent substrate is used for the material of the support film 311-1 so that the IC chip 32-1 and the like are not transparent when the IC label is bonded to an object. It may alternatively be that the encapsulation resin 33-1 for reinforcement is not formed.

The IC label 3-1 with the gluing agent surface, which is exposed as a result of the release paper 36-1 being pealed away, is bonded to the object to be used. In the case of the IC label, the information recorded is read by the read/write device, which is brought close to the IC label bonded to the object.

Figure 10:
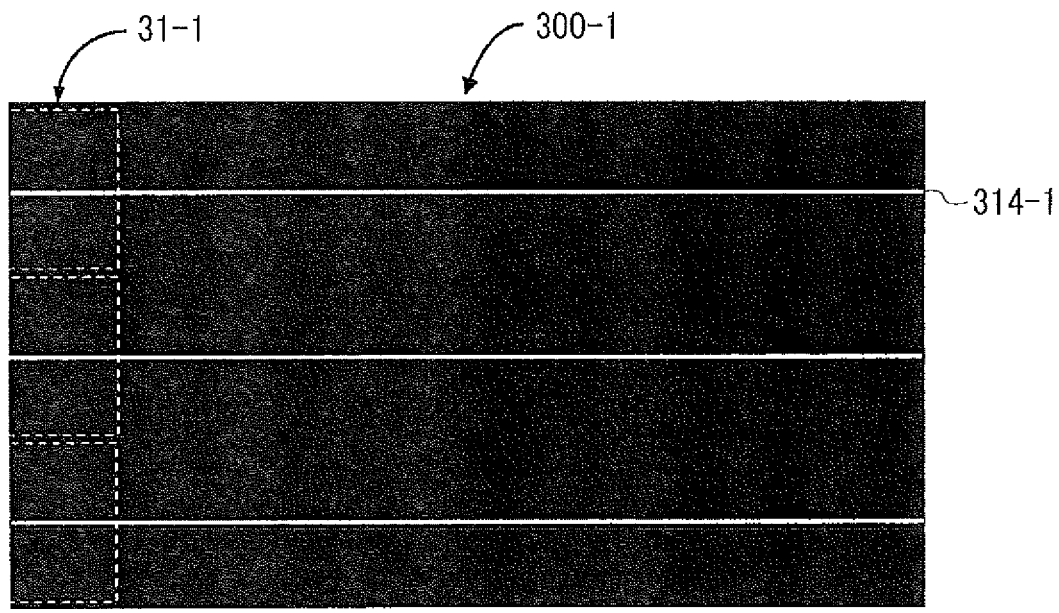
FIG. 10 is a view illustrating an electrically conductive thin plate used in the information recording medium.

A multifaceted electrically conductive thin plate will be explained while referring to FIG. 10.

A multifaceted electrically conductive thin plate 300-1 has a thin sheet of copper or aluminum bonded to a support film for an electrically conductive thin plate (base film of electrically insulating plastic).

A film of 20 to 400 μm thickness of a heat-resistant polyvinyl chloride, polyester, or polyimide, polycarbonate, or the like is used in the plastic base film.

In addition, a deposition or metallic foil of 0.5 to 30 μm is used in the metallic thin sheet.

A line 314-1 without the electrically conductive thin plate at the center of the pair of electrically conductive thin plates is formed by etching by way of an acidic or alkaline solution or cutting with a cutting blade. Although the width of the line 314-1 depends on the spacing of the antenna connection terminals of the IC chip, it is set to approximately 0.5 mm, for example.

Since the connection between the IC chip and the electrically conductive thin plate requires high precision, etching which does not easily incur waviness may be ideally used.

The pair of electrically conductive thin plates in which the line 314-1 is formed is punched out to a predetermined size (shape illustrated by dotted line in FIG. 10), and is passed on to the IC chip mounting process as a pair of electrically conductive thin plates (along with the support film). It may alternatively be possible to perform IC chip mounting in a state in which pairs of electrically conductive thin plates are stretched out in series.

In the present embodiment, it is desirable for the pairs of electrically conductive thin plates equipped to the information recording medium and relay medium to have an area of at least 100 mm$^2$ in order to establish good capacitive coupling between them, when the pair of electrically conductive thin plates equipped to the information recording medium is made to face the pair of electrically conductive thin plates equipped to the relay medium as described above, in order to favorably perform communication between the read/write device, relay medium, and information recording medium.

In this way, although it is preferable for both pairs of electrically conductive thin plates equipped to the information recording medium and relay medium to be larger, it is possible to make the size of the pair of electrically conductive thin plates equipped to the information recording medium smaller by increasing the sizes of the read/write device and the pair of electrically conductive thin plates on the relay medium, for example. Accordingly, it is also possible to provide a space to conduct embossing on the card for a case where the information recording medium is a card or the like.

It may be preferable that the shapes of the pair of electrically conductive thin plates equipped to the information recording medium and the pair of electrically conductive thin plates equipped to the relay medium are formed as a rectangle, elliptical shape, square, or other shapes other than a circle, and the orientation of a long side direction of the respective pairs of electrically conductive thin plates are arranged not coincide with each other. In this manner, it is possible to achieve stabilization of the communication properties depending on displacement, since the change in the area of a region overlapping each other decreases when the relative positions of the information recording medium and relay medium shift.

It may be preferable that a capacitor (capacitor element 23-1 shown in FIG. 5) is connected in series or in parallel to the loop antenna equipped to the relay medium so as to form a series resonance circuit or parallel resonance circuit, thereby efficiently receiving a transmission signal from the read/write device.

It may be preferable that the resonance frequency of the series resonance circuit or parallel resonance circuit of the relay medium is nearly equal to the frequency of the AC signal transmitted from the read/write device (in a case of the carrier wave of the signal transmitted from the read/write device being 13.56 MHz, the resonance frequency of the relay medium is desirably 12 to 20 MHz).

Example

The information recording medium will be explained.

First, in order to prepare a pair of electrically conductive thin plates, a polyester film was used as an electrically insulating film, to which a copper foil of 25 μm thickness as the metallic material was bonded. The line, at which the electrically conductive thin plate is not formed, at the center of the pair of electrically conductive thin plates, was formed by etching at a width of 0.5 mm.

The antenna connection terminals of the IC chip of an ISO/IEC14443 Type A standard (MIFARE type) were connected straddling the pair of electrically conductive thin plates in which the line was formed. In order to reinforce the joints, the IC chip was encapsulated with an encapsulation resin.

The pair of electrically conductive thin plates mounted with the IC chip was packaged inside of the card substrate made from a polyester resin to make the information recording medium.

It should be noted that, although the information recording medium of a card type is used in the above-mentioned example, it is not limited to the above-mentioned example. For example, it may alternatively be possible to use a form in which a plurality of conductive foils are bonded together at a fixed spacing as the pair of electrically conductive thin plates, and an information recording medium such as a label or key holder, and various electronic devices in place of the card.

For the relay medium, a copper foil of 30 μm thickness was bonded to an electrically insulating material such as glass epoxy, polyimide or polyester of 180 μm thickness, and the pair of electrically conductive thin plates and loop antenna were prepared by etching.

The loop antenna was made in 3 turns (size: 40 mm×40 mm), and the size of the pair of electrically conductive thin plates connected to both ends of the antenna was 40 mm×50 mm.

A capacitor was connected in parallel to both ends of the loop antenna, and the capacitance of the capacitor was adjusted so that the resonance frequency was 14 MHz.

The loop antenna and pair of electrically conductive thin plates were arranged adjacently at a spacing of 1 mm, and the beginning end and terminal end of the loop antenna were connected to the pair of electrically conductive thin plates, respectively.

Next, the relay medium was fixed to the read/write device so that the distance between the loop antenna equipped to the read/write device and the loop antenna of the relay medium was 5 mm. Furthermore, a spacer with a thickness of 1 or 2 mm was interposed between the relay medium and information recording medium.

The information recording medium was placed at a predetermined position on the read/write device according to the above-mentioned condition setting, and writing and reading of information in the information recording medium was performed by the read/write device.

In addition, the size and material of the pair of electrically conductive thin plates equipped inside of the information recording medium and the resonance frequency of the relay medium were changed as shown in Table 1 and measurement was made. Results of the measurement indicated that the permitted value of displacement between the information recording medium and relay medium was the largest, when the resonance frequency was 14 MHz (carrier frequency sent from reader/write in practical use is near 14 MHz at 13.56 MHz) the size was 40 mm×50 mm for the electrically conductive thin plates equipped to the relay medium and information recording medium, and the material of the electrically conductive thin plates was copper.

As understood from Table 1, the electrically conductive thin plate equipped inside the information recording medium has a larger permitted value of displacement when the size is larger; however, it is understood that, although the permitted value of displacement decreases when the size of the electrically conductive thin plate equipped inside the information recording medium is on the order of 10 to 25 mm, it is still possible for the read/write device to read.

As described earlier, it becomes possible to broaden the range of use of the information recording medium if the size of the electrically conductive thin plate equipped inside the information recording medium is decreased.

TABLE 1

| Relay Medium (Electrically Conductive Thin Plate) | | Information Recording Medium (Electrically Conductive Thin Plate) | | Permitted Range of Operation (note) | | |
|---|---|---|---|---|---|---|
| Material | Size (mm) | Resonant Frequency (MHz) | Material | Size (mm) | Horizontal Direction | Vertical Direction | Distance |
| Copper | 40 × 50 | 14 | Copper | 40 × 50 | +/−24 | +/−40 | 2 |
| Copper | 40 × 50 | 14 | Copper | 25 × 25 | +/−10 | +/−40 | 1 |
| Copper | 40 × 50 | 14 | Copper | 10 × 10 | +/−1 | +/−23 | 1 |
| Copper | 40 × 50 | 14 | Aluminum | 25 × 25 | +/−10 | +/−40 | 1 |
| Copper | 40 × 50 | 12 | Copper | 40 × 50 | +/−20 | +/−40 | 1 |
| Copper | 40 × 50 | 20 | Copper | 40 × 50 | +/−15 | +/−30 | 1 |

(note)
Permitted Range of Operation (Permitted Range of Displacement) (mm)

From the results of the aforementioned example, it has been proven that it is possible to use a MIFARE type IC chip based on ISO/IEC14443 Type A standard used in contactless IC cards and a reader/writer equipped with an electromagnetic induction-type antenna as is, which are widely used in various fields, and to use them as an inexpensive communication medium and an inexpensive communication system by interposing the aforementioned relay medium therebetween.

Second Embodiment

Hereinafter, a second embodiment of the present invention will be explained while referring to the drawings or the like.

FIGS. 11A and 1B are views each illustrating a communication method of a communication system 1 of a second embodiment.

FIG. 11A is a schematic diagram illustrating a communication method of the communication system 1.

FIG. 11B is a perspective view illustrating a communication method of a reader/writer 21, relay communication device 30, and IC card 40.

The communication system 1 includes the reader/writer 21, relay communication device 30, and IC card 40 (information recording medium).

The reader/writer 21 is a device able to send and receive information with an IC card of an electromagnetic induction type; however, in the present embodiment, it sends and receives information with the IC card 40 of an electromagnetic coupling type via the relay communication device 30 (relay communication medium).

The reader/writer 21 includes a control unit 27, and functions as an electromagnetic induction communication device configured to read and update the information of the IC card 40, receiving instructions from the control unit 27. It should be noted that the reader/writer 21 may be connected by an electrical cable or the like to another electromagnetic induction communication device, and controlled by a control unit thereof.

The control unit 27 is configured to perform unified control of the reader/writer 21, and is composed of a CPU and the like, for example. The control unit 27 realizes various functions relating to the present invention by reading and executing various programs stored in a storage unit (not illustrated) as appropriate.

The reader/writer 21 includes an R/W (reader/writer) loop antenna 21a (electromagnetic induction communication loop antenna).

The R/W loop antenna 21a is a loop antenna of about 3 turns, and the size is about 40 mm×40 mm. The R/W loop antenna 21a is formed of wiring of a copper pattern on a printed wiring substrate by way of a method such as etching, for example. The terminals at both ends of the R/W loop antenna 21a are connected to the control unit 27.

The relay communication device 30 is a device that enables communication between the reader/writer 21 and the IC card 40. The relay communication device 30 includes a relay loop antenna 31 and electrically conductive relay members 32A, 32B.

The relay loop antenna 31 is configured to communicate (couple) through electromagnetic induction with the R/W loop antenna 21a. The relay loop antenna 31 is a loop antenna of about 3 turns, and the size is about 40 mm×40 mm. The relay loop antenna 31 is formed of wiring of a copper pattern on a printed wiring substrate by way of a method such as etching, for example.

The electrically conductive relay members 32A, 32B are members formed with an electrically conductive material such as copper in a sheet shape. The electrically conductive relay members 32A, 32B are electrically connected to both ends of the relay loop antenna 31, respectively. The electrically conductive relay members 32A, 32B are arranged in parallel across a slit 30a.

The electrically conductive relay members 32A, 32B are nearly in contact with a pair of electrically conductive plates 42A, 42B (described later) of the IC card 40 (for example, the distance between the upper face of the electrically conductive relay members 32A, 32B and the lower face of the electrically conductive plates 42A, 42B is approximately 2 mm). The electrically conductive relay members 32A, 32B are arranged opposite to the electrically conductive plates 42A, 42B, respectively, so that they are electrostatically coupled with each other.

The IC card 40 is a card capable of contactless IC communication without a loop-type antenna. The IC card 40 includes an IC chip 41, a pair of electrically conductive plates 42A, 42B, a lower layer 43 and an upper layer 44.

The IC chip 41 is an integrated circuit configured to communicate through electromagnetic induction, and is the same kind as that built into a conventional IC card of an electromagnetic induction method. The IC chip 41 includes a storage unit that storage programs, information, etc. required in the operation of the IC card 40, and a control unit that performs unified control of the IC card 40 by reading and executing various programs stored in this storage unit as appropriate.

The IC chip 41 has a thickness of approximately 150 μm, for example. The IC chip 41 is arranged so as to straddle the electrically conductive plates 42A, 42B.

An I/O unit (lead frame, etc.) of the IC chip 41 is electrically and physically connected to the electrically conductive plates 42A, 42B, respectively, by way of a connection member 46 such as an anisotropic conductive paste, an anisotropic conductive film, or a conductive adhesive. It should be noted that since the IC chip 41 is of an electromagnetic induction type, this I/O unit is primarily connected to the loop antenna.

The electrically conductive plates 42A, 42B are each aluminum foil that is 10 μm thick, and has a short side×long side of 20 mm×25 mm. The electrically conductive plates 42A, 42B are bonded to the lower layer 43. The details of the electrically conductive plates 42A, 42B will be described later.

The lower layer 43 is a substrate of the IC card 40. The lower layer 43 is an insulating film substrate of PET, PET-G, PVC, polyimide or the like having a thickness of 180 μm and short side×long side of 25.0 mm×57.5 mm, for example.

The upper layer 44 is paper, resin, or the like with a thickness of 200 μm, for example. The upper layer 44 is bonded to the lower layer 43 by a gluing agent 45 or the like so as to cover the IC chip 41 and electrically conductive plates 42A, 42B.

Communication between the reader/writer 21 and IC card 40 via the relay communication device 30 will be explained.
Connection between Reader/Writer 21 and Relay Communication Device 30

Since the R/W loop antenna 21a and relay loop antenna 31 are contactlessly connected to each other through electromagnetic induction, it is possible to send and receive information therebetween. The communication method of the IC card 40 using an electromagnetic induction method is standardized by ISO/IEC14443, 15693 and 18092, and the signal frequency of 13.56 MHz is used.

It should be noted that, although an example in which the number of turns of the R/W loop antenna 21a and relay loop antenna 31 are on the order of 3 has been explained, it is not limited thereto. It may be sufficient so long as the number of turns allows the two to be contactlessly connected through electromagnetic induction, and the number of turns may be 1 turn or more, for example.
Connection between Relay Communication Device 30 and IC Card 40

The electrically conductive relay members 32A, 32B and electrically conductive plates 42A, 42B, which are disposed opposite to each other, function as capacitor plates. Accordingly, the two is connected contactlessly through electromagnetic induction to implement the transmission of information therebetween.

In the communication system 1, electromotive force occurs when the relay loop antenna 31 approaches the R/W loop antenna 21a. Accordingly, the electrically conductive relay members 32A, 32B and electrically conductive plates 42A, 42B are electrostatically coupled with each other, and the driving power is transmitted to the IC chip 41. In addition, it is possible to transmit data sent from the reader/writer 21 to the IC chip 41, while it is possible to transmit reply data from the IC chip 41 to the reader/writer 21 via the relay communication device 30.

In this manner, it is possible for the communication system 1 to perform communication processing between the control unit 27 of the reader/writer 21 and the IC chip 41 of the IC card 40.

Next, the shape in the plan view of the IC card 40 (illustration viewing the card surface from a normal vector direction) will be explained in detail.

Figure 12A:
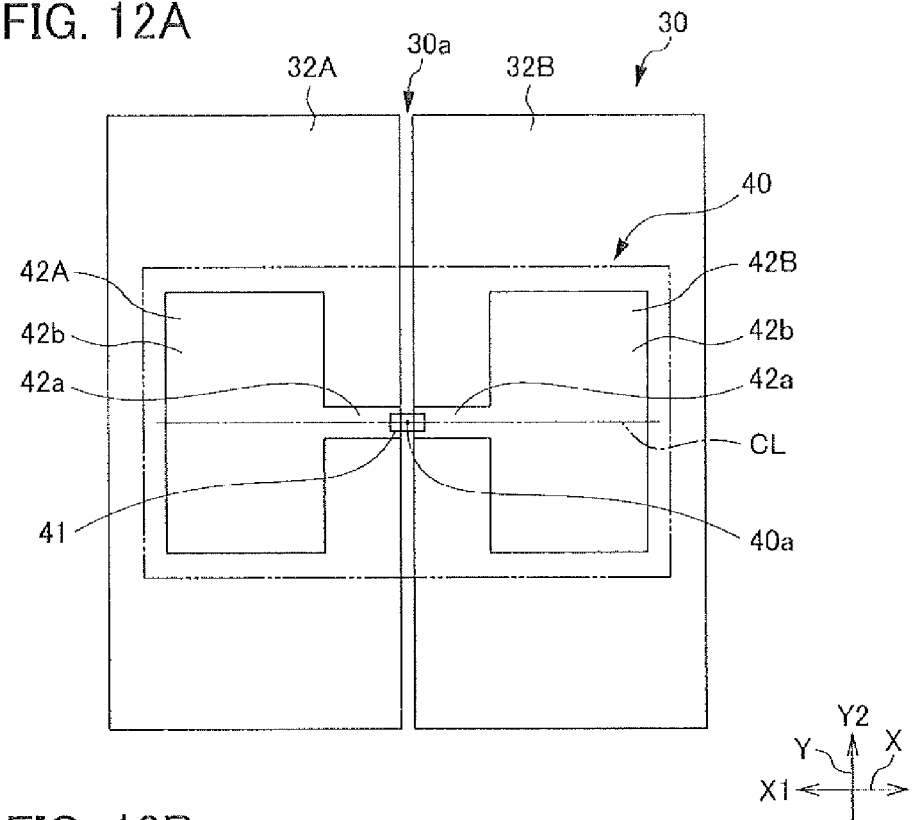
FIG. 12 is a plan view when an IC card 40 and relay communication device 30 of the second embodiment is used.
Figure 12B:
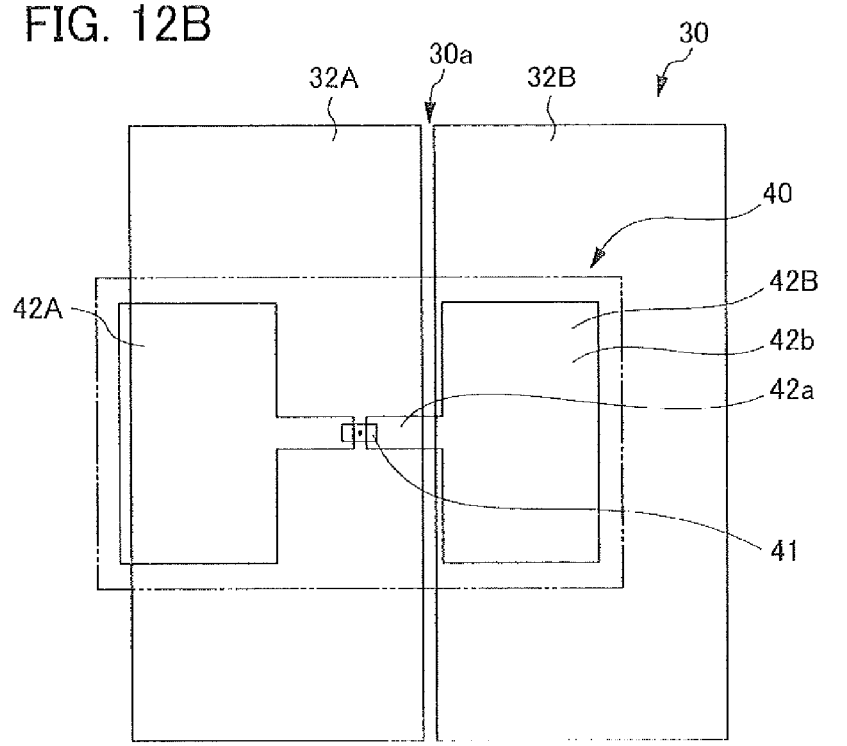

FIGS. 12A and 12B are plan views during use of the IC card 40 and relay communication device 30 of the second embodiment.

FIG. 12A shows the IC card 40 arranged at a reference position relative to the relay communication device 30.

FIG. 12B is the IC card 40 shifted to a left side X1 relative to the relay communication device 30.

It should be noted that the visible outline of the IC card 40 is shown by a two-dot chain line as appropriate in the plan views.

As shown in FIG. 12A, the pair of electrically conductive plates 42A, 42B is disposed at the IC card 40 in a left-right direction X.

The electrically conductive plates 42A, 42B are line symmetric with respect to a center line CL parallel to the left-right direction X, and are point symmetric with respect to a center 40a of the IC card 40.

The conductive plate 42A has a small part 42a and a large part 42b.

The small part 42a is a rectangular portion arranged on an inner side (side closer to the IC chip 41). A width (length in a vertical direction Y) of the small part 42a is smaller than a width of the large part 42b. The small part 42a is a rectangle that is long in the left-right direction X, and having a constant width in the vertical direction Y.

The large part 42b is a rectangular portion arranged in a region on an outer side (a side opposite to the IC chip 41) in the card plane.

The conductive plate 42B also has a small part 42a and large 42b similarly to the conductive plate 42A.

The IC chip 41 is arranged at leading ends of the two small parts 42a so as to straddle a gap between the two small parts 42a.

FIG. 12A shows the IC card 40 arranged at the reference position relative to the relay communication device 30, i.e. a state in which the center of the IC card 40 is arranged so as to be positioned on the slit 30a between the electrically conductive relay members 32A, 32B, and the long-side direction of the IC card 40 is arranged so as to be the left-right direction X. At the reference position, the electrically conductive plate 42A electrostatically couples with only the electrically conductive relay member 32A, and the electrically conductive plate 42B electrostatically couples with only the electrically conductive relay member 32B. As a result, the communication stability of the IC card 40 is the highest at the reference position.

In the displaced state shown in FIG. 12B, the electrically conductive plate 42B is displaced to an extent that almost the entire region of the small part 42a overlaps the relay member 32A.

As a result, the small part 42a of the electrically conductive plate 42B is electrostatically coupled to the relay member 32A; however, the large part 42b of the electrically conductive plate 42B is not electrostatically coupled to the electrically conductive relay member 32A. In other words, if the IC card 40 is displaced to an extent that the small part 42a of the electrically conductive plate 42B overlaps the relay member 32A, it is possible to maintain a state in which the large part 42b of the electrically conductive plate 42B electrostatically couples only to the electrically conductive relay member 32B. In addition, regarding the voltage required in the IC chip 41, since the potential difference required for communication is maintained so long as the small part 42a of the electrically conductive plate 42B is electrostatically coupled to the electrically conductive relay member 32A, it is possible to increase the communication stability during use of the IC card 40.

Figure 13:
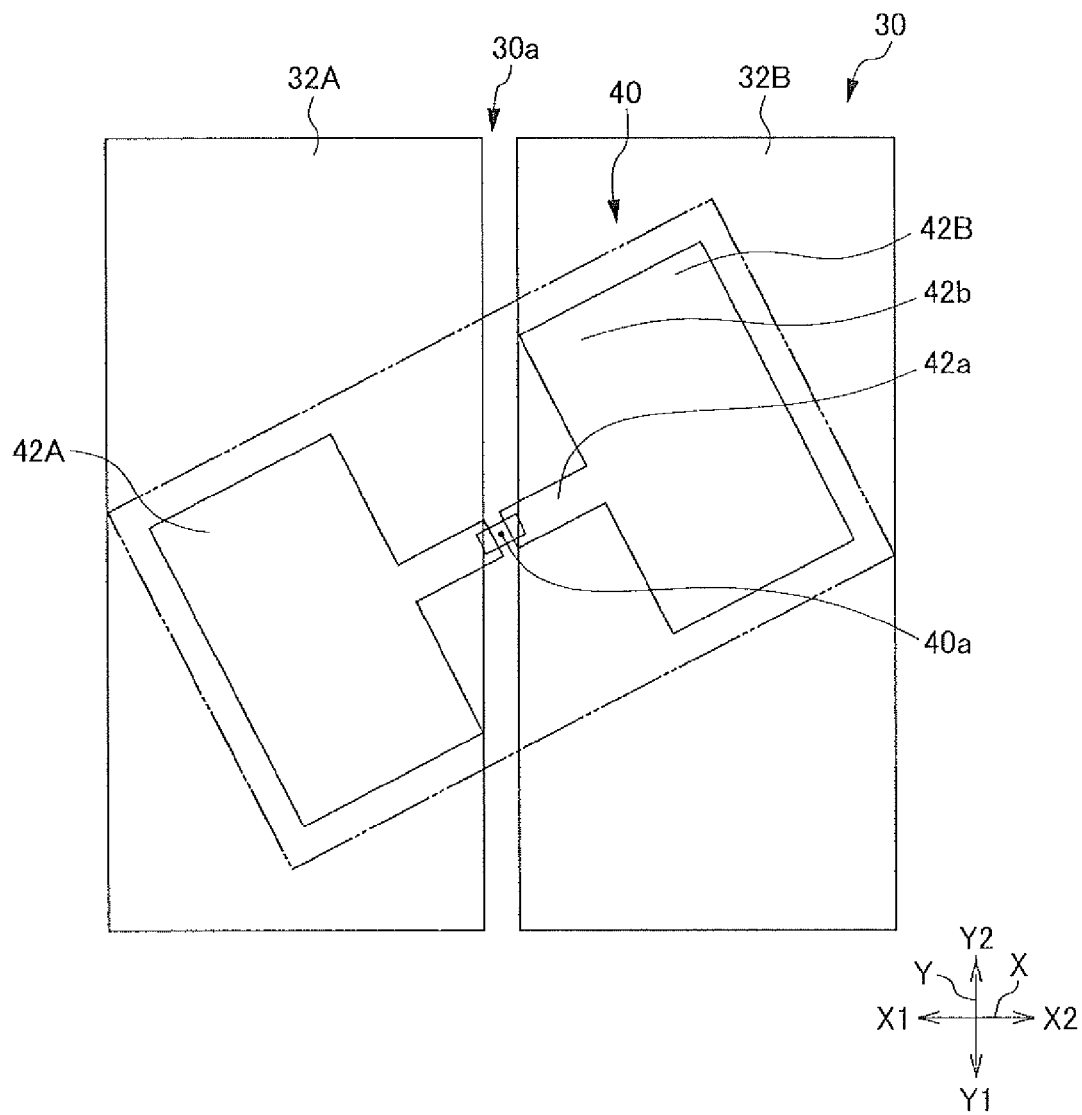
FIG. 13 is a plan view of the IC card 40 of the second embodiment having been rotated counterclockwise relative to the relay communication device 30.

FIG. 13 is a plan view showing the IC card 40 of the second embodiment having been rotated counterclockwise relative to the relay communication device 30.

Due to including the small part 42a, a certain extent of rotation (in this example, approximately 30 degrees) is permitted until the large part 42b of the electrically conductive plate 42B overlaps the electrically conductive relay member 32A, when the IC card 40 rotates about the center 40a staying on the slit 30a. The above descriptions are similarly applied to the large part 42b of the electrically conductive plate 42A and electrically conductive relay member 32B. As a result, not only in a case of the IC card 40 being displaced relative to the relay communication device 30, but also in a case of being rotated from the reference position, the electrical potential required for communication is maintained up to a certain extent. Accordingly, it is possible to increase the communication stability during use of the IC card 40.

As explained in the foregoing, when a user holds the IC card 40 above the electrically conductive relay members 32A, 32B, the IC card 40 of the present embodiment absorbs this shift and rotation, even if the IC card 40 rotates relative to the electrically conductive relay communication members 32A, 32B or its position shifts from the reference position. Accordingly, it is possible for the IC card 40 to communicate between the pair of electrically conductive plates 42A, 42B and the pair of electrically conductive relay members 32A, 32B. As a result, it is possible to increase the tolerance to displacement or rotation of the IC card 40 relative to the electrically conductive relay members 32A, 32B.

Third Embodiment

Next, a third embodiment of the present invention will be explained. It should be noted that, in the following explanation and drawings, the same symbols or the same ending symbols are assigned to portions carrying out functions similar to the aforementioned second embodiment, and redundant explanations will be omitted as appropriate.

Figure 14:
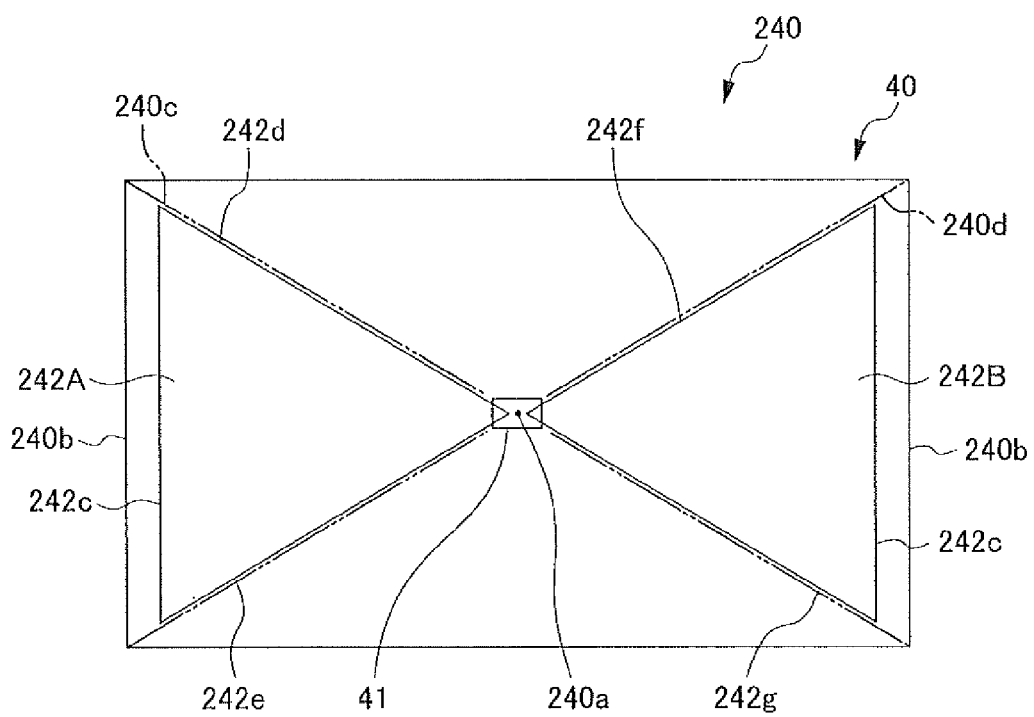
FIG. 14 is a plan view of an IC card 240 of a third embodiment.

FIG. 14 is a plan view of an IC card 240 of the third embodiment.

Electrically conductive plates 242A, 242B are isosceles triangles in which a side parallel to a short side 240b of the IC card 240 is a base side 242c and oblique sides (straight lines) meet at an installation portion of an IC chip 41. As a result, the electrically conductive plates 242A, 242B have a width (length in a vertical direction) that narrows from an outer side (opposite side to the IC chip 41) towards an inner side (IC chip 41 side). The electrically conductive plates 242A, 242B are point symmetric with respect to a center 240a of the IC card 240 card.

The IC chip 41 is placed at the center 240a of the IC card 240. As a result, a side 242d of the electrically conductive plate 242A and a side 242g of the electrically conductive plate 242B are substantially in agreement with a diagonal 240c of the IC card 240. On the other hand, a side 242e of the electrically conductive plate 242A and a side 242f of the electrically conductive plate 242B are substantially in agreement with a diagonal 240d of the IC card 240.

Figure 15A:
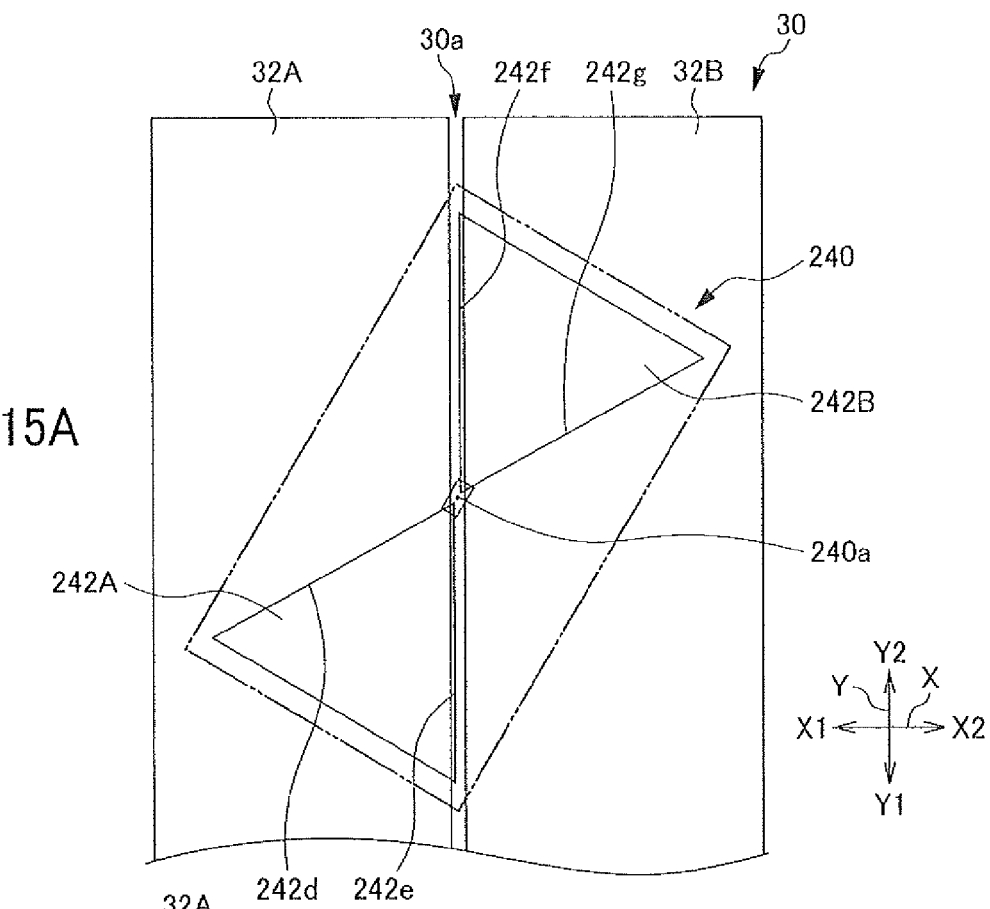
FIG. 15A is a plan view of the IC card 240 of the third embodiment having been rotated counterclockwise relative to the relay communication device 30.
Figure 15B:
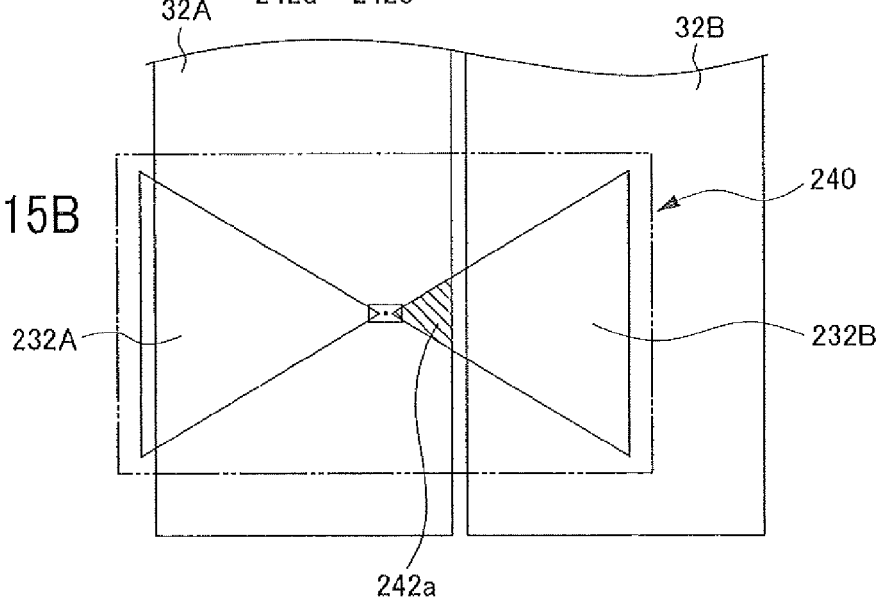
FIG. 15B is a plan view of the IC card 240 having been moved to a left side X1 relative to the relay communication device 30.

FIG. 15A is a plan view of the IC card 240 of the third embodiment having been rotated counterclockwise relative to a relay communication device 30, and FIG. 15B is a plan view of the IC card 240 having been moved to a left side X1 relative to the relay communication device 30.

Since the shape of the electrically conductive plate 242B is an isosceles triangle as shown in FIG. 15A, it is possible for the IC card 240 to be rotated to some extent until overlapping the electrically conductive plate 242B and an electrically conductive relay member 32A when the IC card 240 is rotated while the center 240a stays over a slit 30a. The above descriptions are similarly applicable to the electrically conductive plate 242A.

It should be noted that, since the respective sides 242d to 242g of the electrically conductive plates 242A, 242B are substantially in agreement with the diagonals of the IC card 240, the IC card 240 can rotate until the respective sides 242d to 242g are substantially in agreement with the slit 30a (in this case, approximately 60 degrees counterclockwise).

Even if rotated, the IC card 240 can maintain a state in which the electrically conductive plate 242A electrostatically couples with only the electrically conductive relay member 32A, and the electrically conductive plate 242B electrostatically couples with only an electrically conductive relay member 32B, up to the state shown in FIG. 14A, i.e. until the respective sides 242d to 242g exceed the slit 30a. As a result, the highest communication stability of the IC card 240 is maintained, and it is possible to remarkably increase the communication stability during use of the IC card 240.

It should be noted that the electrically conductive plates 242A, 242B are point symmetrical with respect to the center 240a of the IC card 240 card as described in the foregoing. As a result, the rotation tolerance is maintained the same until any of the respective sides 242d to 242g of the electrically conductive plates 242A, 242B exceeds the slit 30a, when the IC card 240 is rotated counterclockwise and clockwise from the reference position. It is possible to avoid a system vulnerable to rotation in a specific direction.

In addition, the electrically conductive plates 242A, 242B have a shape of a triangle; therefore, the inner side (side closer to the IC chip 41) has a smaller area than the outer side (opposite to the IC chip 41 side).

As a result, even if the IC card 240 moves a certain extent to the left side X1 relative to the relay communication device 30, a portion 242a having a small area of the electrically conductive plate 242B will merely overlap the electrically relay member 32A. Regarding the voltage required in the IC chip 41, since the potential difference required for communication is maintained if the IC card 240 is displaced to a certain extent, it is possible to increase the communication stability during use of the IC card 240, similarly to the second embodiment.

As explained in the foregoing, the IC card 240 of the present embodiment can improve the communication stability even if rotated or displaced from the reference position during use, since the electrically conductive plates 242A, 242B are triangular and the respective sides 242d to 242g are linear.

Fourth Embodiment

Next, a fourth embodiment of the present invention will be explained.

Figure 16A:
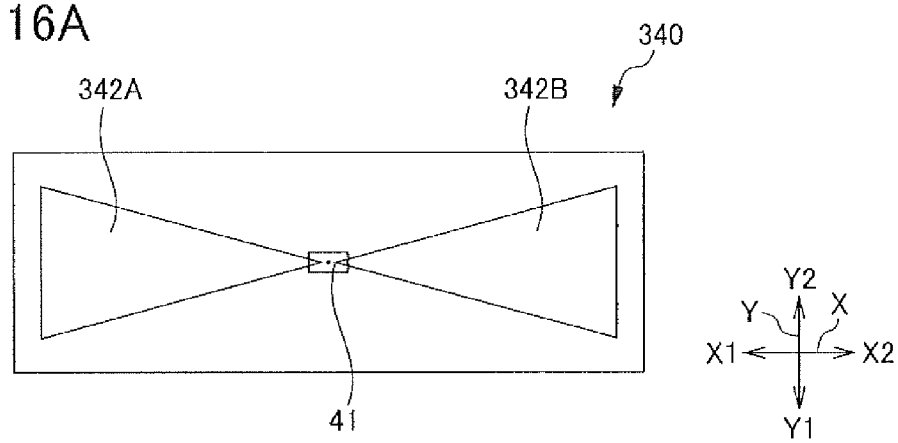
FIG. 16A is a plan view of an IC card 340 of a fourth embodiment.
Figure 16B:
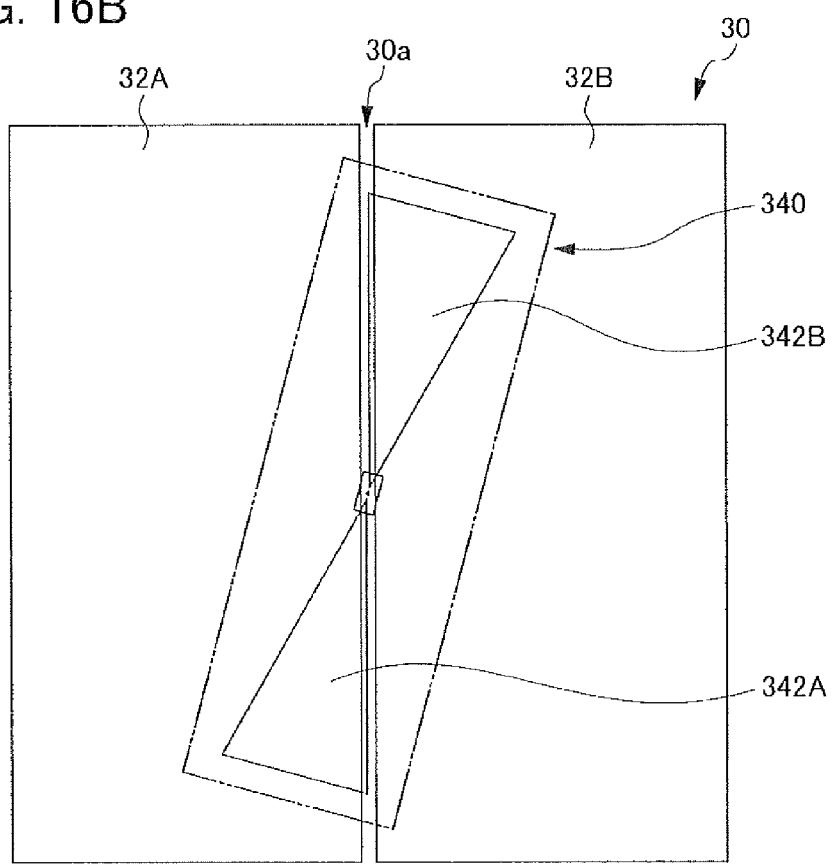
FIG. 16B is a plan view of the IC card 340 having been rotated relative to the relay communication device 30.

FIG. 16A is a plan view of an IC card 340 of a fourth embodiment, and FIG. 16B is a plan view of the IC card 340 having been rotated relative to a relay communication device 30.

As shown in FIG. 16A, in the IC card 340 of the fourth embodiment, an angle on a card inner side (side closer to an IC chip 41) of electrically conductive plates 342A, 342B is approximately 30 degrees, which is smaller than the angle of the third embodiment. In addition, the IC card 340 has a length shorter than the third embodiment in a vertical direction Y.

As a result, even if rotated greater than in the third embodiment (approximately 75 degrees) as shown in FIG. 16B, the IC card 340 maintains a state in which the electrically conductive plate 342A electrostatically couples only with the electrically conductive relay member 32A, and the electrically conductive plate 342B electrostatically couples only with the electrically conductive relay member 32B. As a result, the IC card 340 can further increase the communication stability when rotated.

In addition, since it is possible to form the IC card 340 to be narrow and long in a left-right direction X, the IC card 340 can be used in the ticket for a train, for example, and it is possible to increase the degrees of freedom in card shape.

Fifth Embodiment

Next, a fifth embodiment of the present invention will be explained.

FIG. 17 is a plan view of an IC card 440 of the fifth embodiment.

The IC card 440 of the fifth embodiment differs from the third embodiment in that a rectangular part 442b is provided at an outer side (side opposite to an IC chip) of a triangular part 442a of electrically conductive plates 442A, 442B.

Since the area of the electrically conductive plates 442A, 442B can be increased, the IC card 440 can improve the communication stability.

Sixth Embodiment

Next, a sixth embodiment of the present invention will be explained.

Figure 18A:
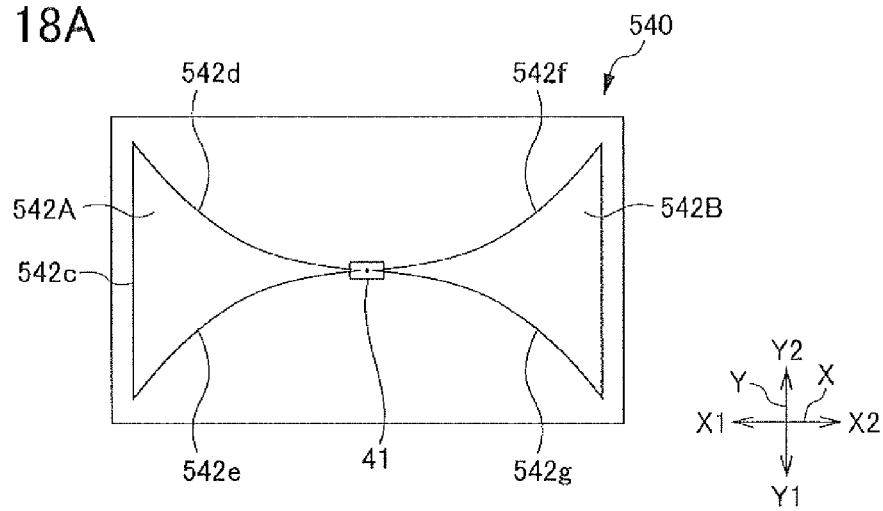
FIG. 18A is a plan view of an IC card 540 and a relay communication device 30 of a sixth embodiment.
Figure 18B:
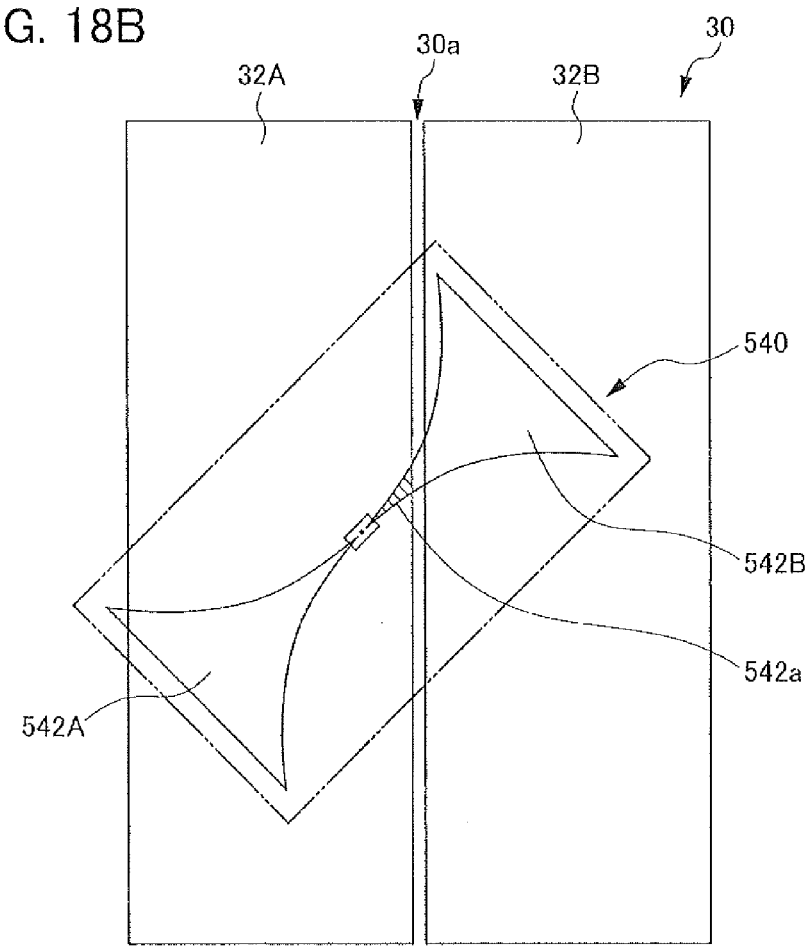
FIG. 18B is a plan view of the IC card 540 having been displaced and rotated relative to the relay communication device 30.

FIG. 18A is a plan view of an IC card 540 and a relay communication device 30 of a sixth embodiment, and FIG. 18B is a plan view of the IC card 540 having been displaced and rotated relative to the relay communication device 30.

As shown in FIG. 18A, the shape of electrically conductive plates 542A, 542B is substantially triangular similarly to the third embodiment. The IC card 540 of the sixth embodiment differs from the third embodiment in that portions corresponding to the sides on the IC chip 41 side are formed by curved lines 542d to 542g.

With the curved lines 542d to 542g, the width of the respective electrically conductive plates 542A, 542B (length in a vertical direction Y) narrows as the width approaches an inner side (side closer to the IC chip 41) from an outer side (opposite to the IC chip 41).

As a result, as shown in FIG. 18B, the IC card 540 can decrease the area of an overlap portion 542a of the electrically conductive plate 542B and electrically conductive relay member 32B, even if a shift in a left-right direction X and rotation counterclockwise occur simultaneously. The IC card 540 can thereby increase the communication stability relative to both shift in the left-right direction X and rotation.

It should be noted that since the voltage potential difference required for operating the IC chip 41 is maintained so long as there is an overlap area of a certain extent shown in FIG. 18B, the IC card 540 can increase the communication stability during use.

As explained in the foregoing, the IC card 540 can increase the tolerance for both shift and rotation with proper balance, and increase the communication stability.

Seventh Embodiment

Next, a seventh embodiment of the present invention will be explained.

Figure 19A:
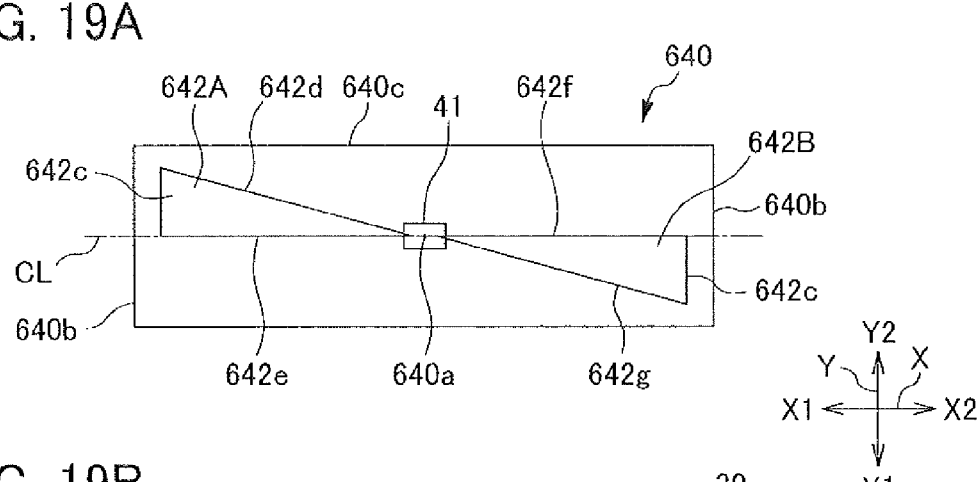
FIG. 19A is a plan view of an IC card 640.
Figure 19B:
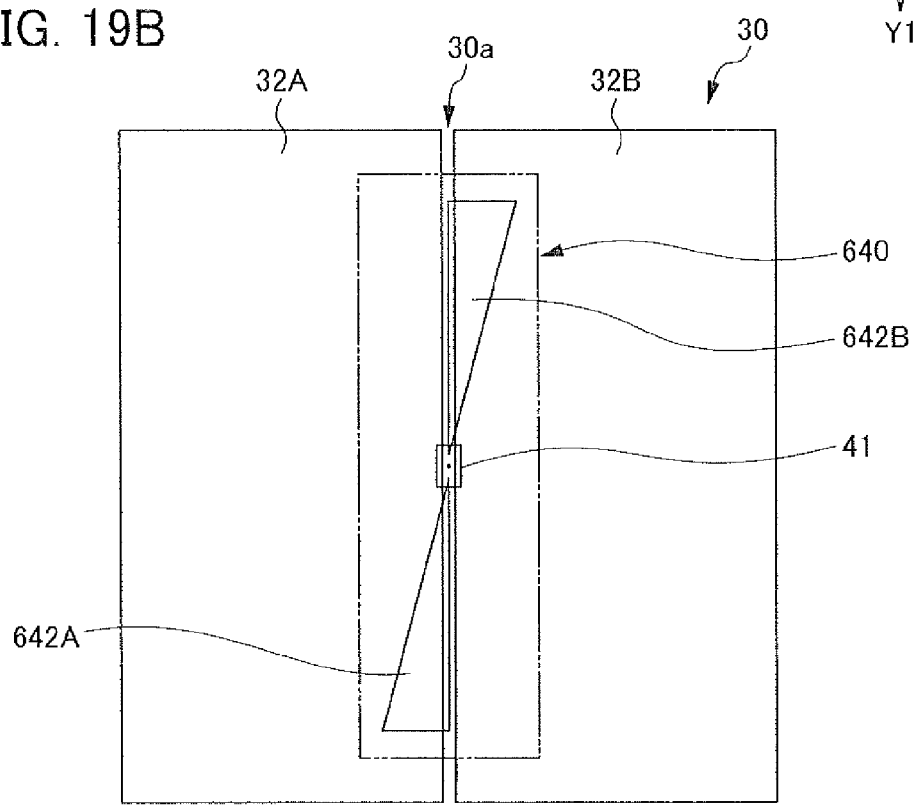
FIG. 19B is a plan view of the IC card 640 having been rotated relative to the relay communication device 30.
Figure 19C:
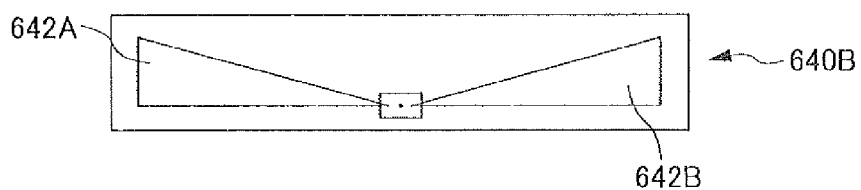
FIG. 19C is a plan view of an IC card 640B.

FIG. 19A provides a plan view of an IC card 640 of the seventh embodiment, FIG. 19B is a plan view of the IC card 640 having been rotated relative to a relay communication device 30, and FIG. 19C is a plan view of an IC card 640B.

Electrically conductive plates 642A, 642B of the seventh embodiment include base sides 642c, sides 642e, 642f, and sides 642d, 642g.

A base side 642c is parallel to a short side 640b of the IC card 640. The sides 642d, 642g are arranged on a diagonal line of the IC card 640. The sides 642e, 642f are arranged on a center line CL parallel to a long side 640c. The electrically conductive plates 642A, 642B are point symmetrical with respect to a center 640a of the IC card 640.

The seventh embodiment differs from the fourth embodiment in that an angle formed by the side 642d and the side 642e and an angle formed by the side 642f and the side 642g, i.e. angles on a card inner side (side closer to an IC chip 41) is approximately 15 degrees.

As a result, even if rotated from the reference position by 90 degrees counterclockwise as shown in FIG. 19B, the IC card 640 can maintain a state in which the electrically conductive plate 642A electrostatically couples with only the electrically conductive relay communication member 32A, and the electrically conductive plate 642B electrostatically couples with only the electrically conductive relay member 32B. As a result, the IC card 640 can increase the communication stability when rotated.

In addition, it is possible to form a shape of the IC card 640 to be narrow and long in a left-right direction X, the IC card 640 can increase the degrees of freedom in shape, and can be used in the ticket for a train or the like, for example.

In addition, the IC card 640 can also increase the shift tolerance for the same reason as the third embodiment.

Furthermore, if the electrically conductive plates 642A, 642B are made left-right symmetrical as the IC card 640B shown in FIG. 19C, it is possible to render the IC card 640B to be narrower and longer.

Since the IC card 640 can increase the tolerance to rotation and be made into a narrow and long shape, it is possible to increase the degrees of freedom in shape.

Eighth Embodiment

Next, an eighth embodiment of the present invention will be explained.

Figure 20:
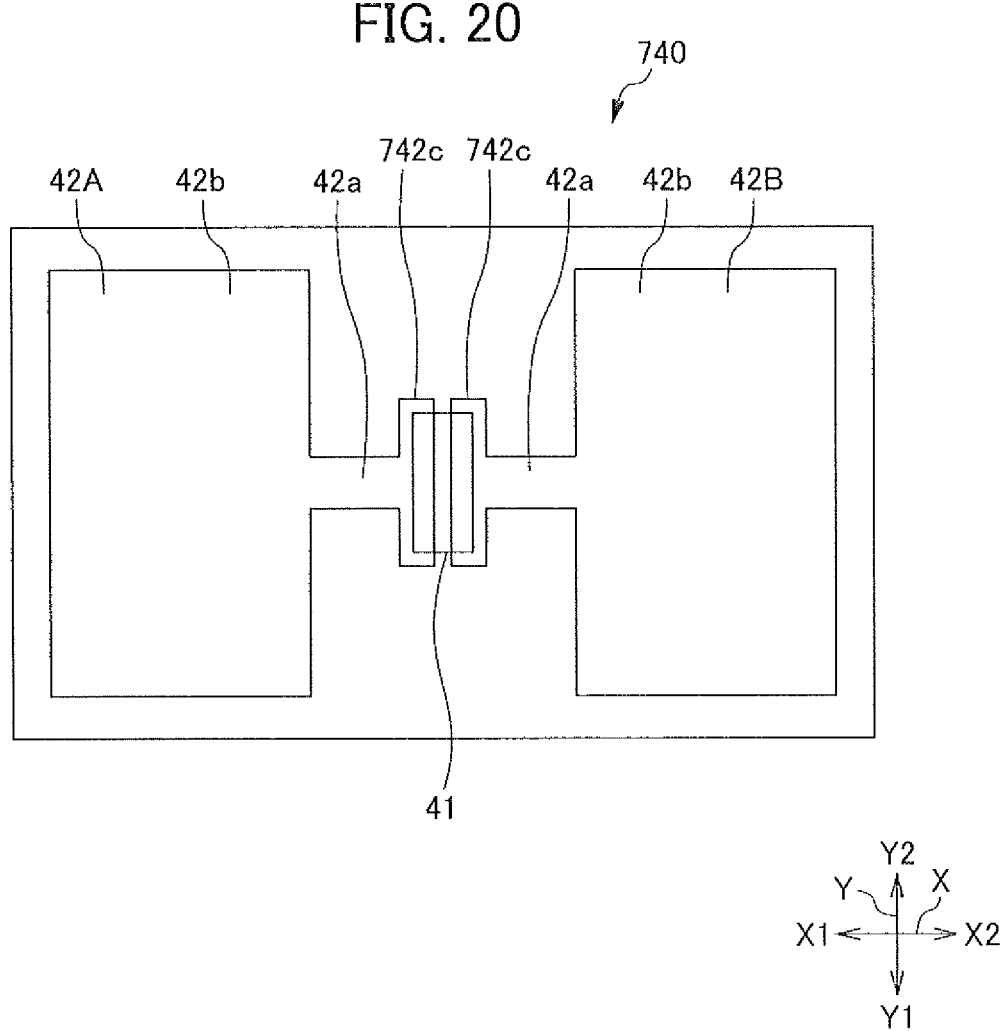
FIG. 20 is a plan view of an IC card 740 of an eighth embodiment.

FIG. 20 is a plan view of an IC card 740 of the eighth embodiment.

The IC card 740 of the eighth embodiment is provided with rectangular regions 742c extending in a vertical direction Y at inner sides of the small parts 42a of the electrically conductive plates 42A, 42B of the second embodiment.

The IC card 740 of the present embodiment can thereby provide an installation region suiting the size of an IC chip 41, and can decrease the area of the small part 42*a*.

Ninth Embodiment

Next, a ninth embodiment of the present invention will be explained.

Figure 21A:
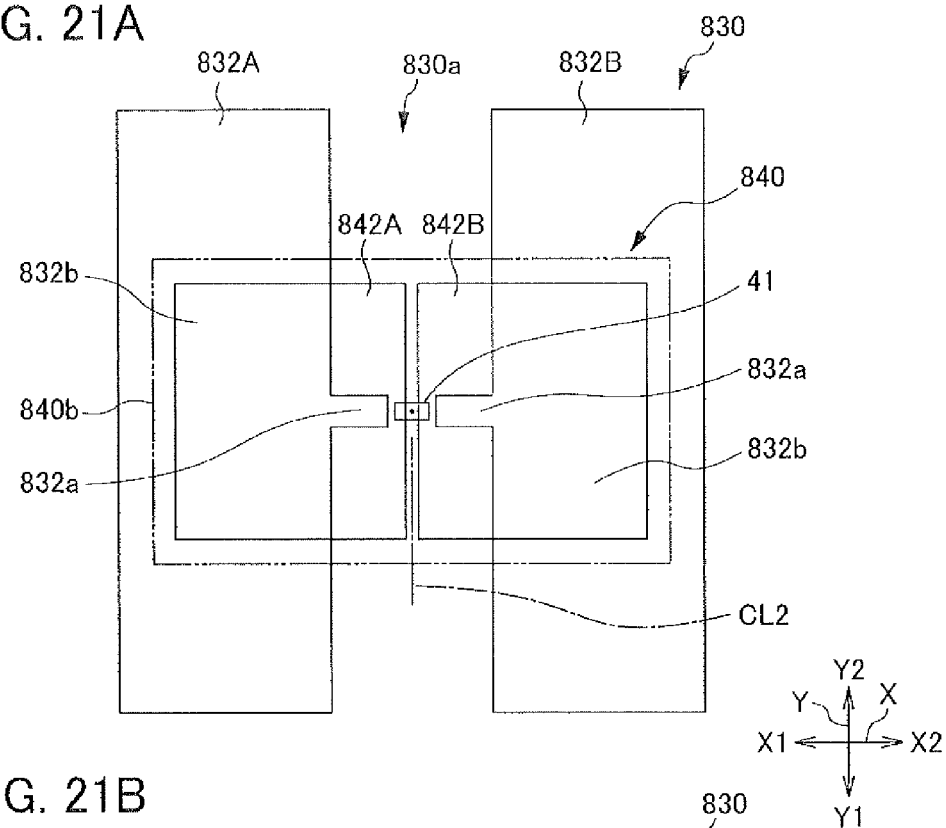
FIG. 21A is a plan view showing an IC card 840 and FIG. 21B is a plan view showing a relay communication device 830 in use of a ninth embodiment.
Figure 21B:
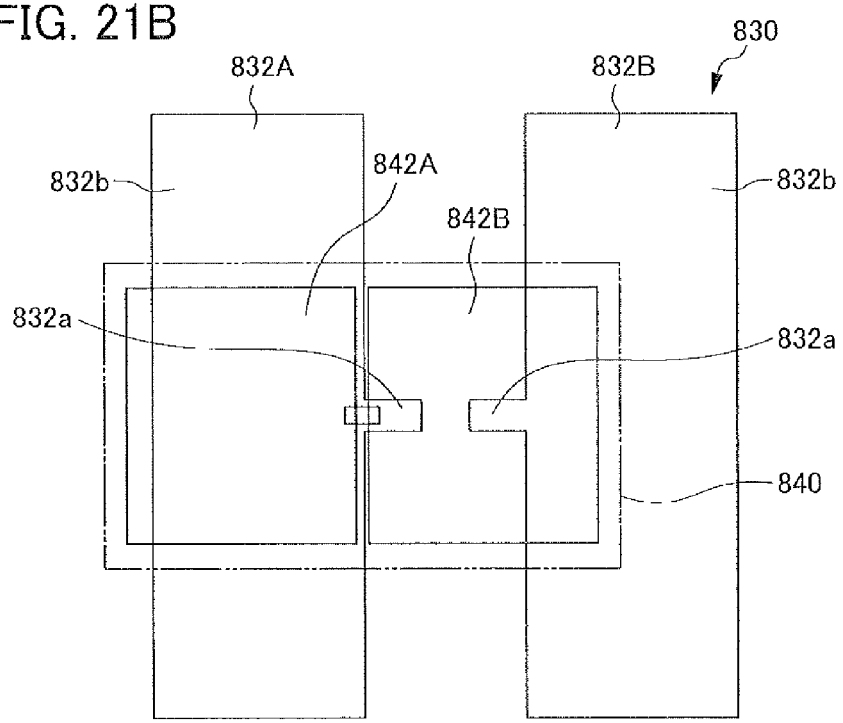

FIGS. 21A and 21B are plan views showing an IC card 840 and a relay communication device 830 in use of the ninth embodiment.

FIG. 21A shows the IC card 840 arranged at a reference position relative to the relay communication device 830.

FIG. 21B shows the IC card 840 having been shifted to a left side X1 relative to the relay communication device 830.

In the ninth embodiment, the respective shapes of the electrically conductive plates 42A, 42B of the IC card 40 and the electrically conductive relay members 32A, 32B of the relay communication device 30 of the second embodiment have been substituted for each other.

As shown in FIG. 21A, electrically conductive plates 842A, 842B of the IC card 840 are rectangles, and are symmetrically arranged relative to a center line CL2 parallel to a short side 840*b* of the IC card 840.

The relay communication device 830 has a pair of electrically conductive relay members 832A, 832B arranged across a slit 830*a*.

The electrically conductive relay members 832A, 832B each have a small part 832*a* and a large part 832*b*.

The large part 832*b* is a rectangular portion arranged in a region on an outer side (side opposite to an IC chip 41).

The small part 832*a* is a rectangular portion arranged on an inner side (side closer to the slit 830*a*). The width (length in a vertical direction Y) of the small part 832*a* is smaller than the width of the large part 382*b*. The small part 832*a* is a rectangle that is long and narrow in a left-right direction X, and having a constant width in the vertical direction Y.

In this way, even if the arrangement of the IC card 840 relative to the electrically conductive relay members 832A, 832B is displaced and rotated with respect to the reference position, as shown in FIG. 21B, it is possible to permit this shift and rotation similarly to the second embodiment.

Tenth Embodiment

Next, a tenth embodiment of the present invention will be explained.

Figure 22A:
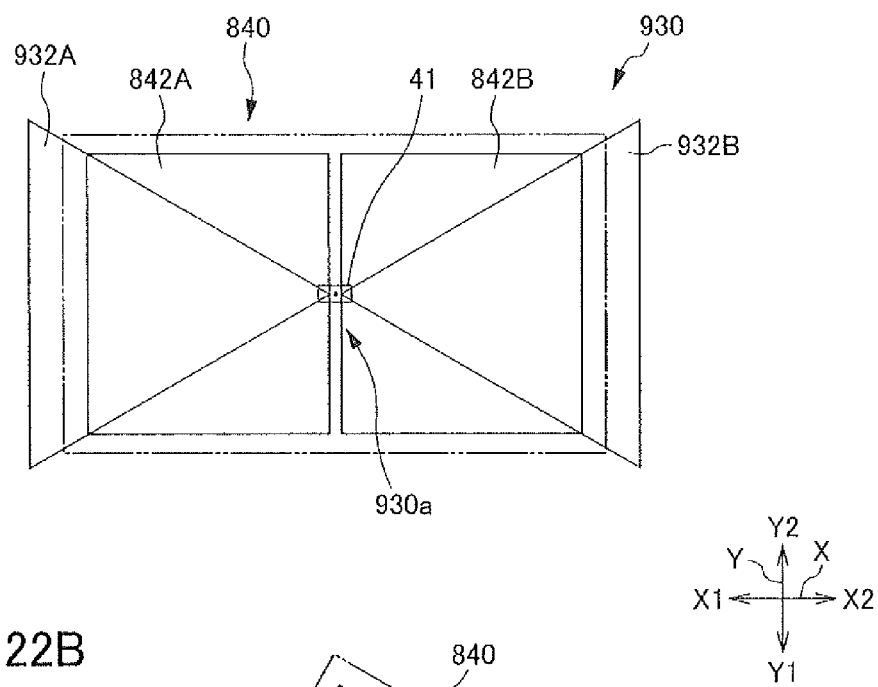
FIG. 22A is a plan view of an IC card 840 and relay communication device 930 of a tenth embodiment.
Figure 22B:
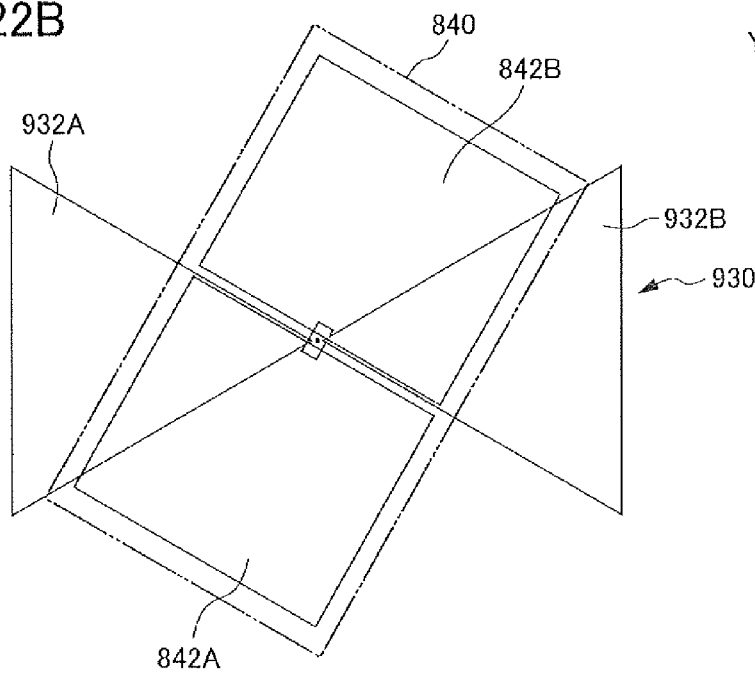
FIG. 22B is a plan view of the IC card 840 having been rotated counterclockwise relative to the relay communication device 930.

FIG. 22A is a plan view showing an IC card 840 and a relay communication device 930 of a tenth embodiment, and FIG. 22B is a plan view showing the IC card 840 having been rotated counterclockwise relative to the relay communication device 930.

In the tenth embodiment, the respective shapes of the electrically conductive plates 242A, 242B of the IC card 240 and the electrically conductive relay members 32A, 32B of the relay communication device 30 of the third embodiment are substituted for each other.

The shape of the IC card 840 is the same as the ninth embodiment.

The relay communication device 930 has electrically conductive relay members 932A, 932B that are isosceles triangles. In other words, the electrically conductive plates 242A, 242B of the IC card 840 are isosceles triangles in the third embodiment; whereas, the electrically conductive relay members 932A, 932B are formed as isosceles triangles in the tenth embodiment.

Accordingly, the IC card 840 can maintain, even if rotated, a state in which the electrically conductive plate 842A electrostatically couples with only the electrically conductive relay member 932A, and the electrically conductive plate 842B electrostatically couples with only the electrically conductive relay member 932B up to the state shown in FIG. 22B, similarly to the third embodiment. As a result, a state is established in which the communication stability of the IC card 840 is the highest, whereby the communication stability during use can be improved remarkably.

In addition, even if the IC card 840 moves to a certain extent to a left side X1 relative to the relay communication device 930, it is possible to improve communication stability during use of the IC card 840 similarly to the third embodiment (explanation omitted).

Eleventh Embodiment

Next, an eleventh embodiment of the present invention will be explained.

Figure 23A:
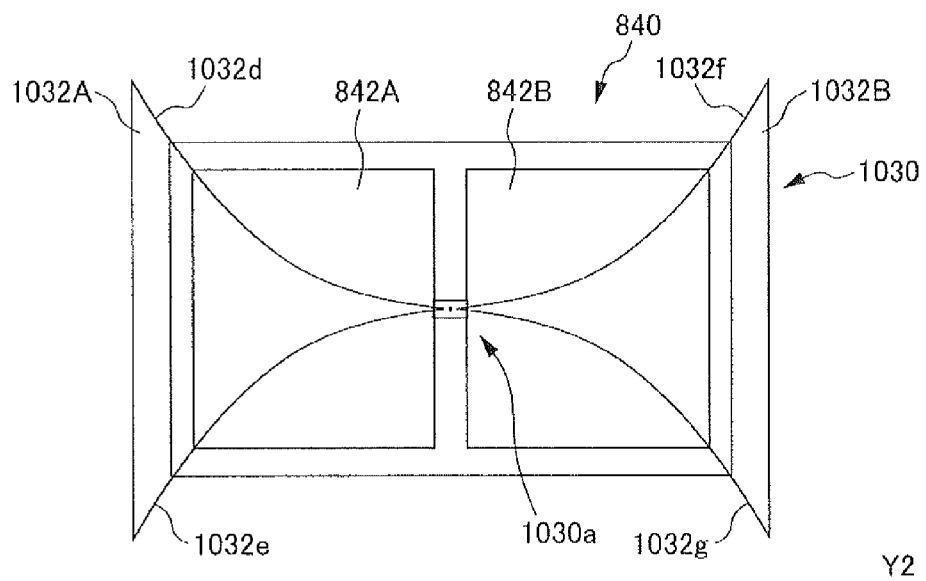
FIG. 23A is a plan view of an IC card 840 and relay communication device 1030 of an eleventh embodiment.
Figure 23B:
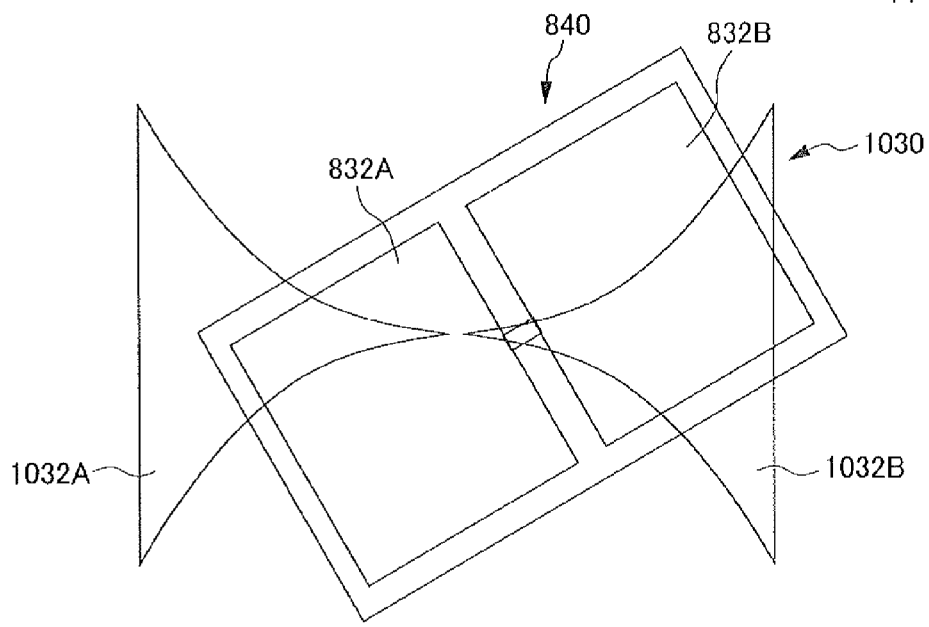
FIG. 23B is a plan view of the IC card 840 having been displaced and rotated relative to the relay communication device 1030.

FIG. 23A is a plan view of an IC card 840 and a relay communication device 1030 of the eleventh embodiment, and FIG. 23B is a plan view of the IC card 840 having been displaced and rotated relative to the relay communication device 1030.

In the eleventh embodiment, the respective shapes of the electrically conductive plates 542A, 542B of the IC card 540 and the electrically conductive relay members 32A, 32B of the relay communication device 30 of the sixth embodiment are substituted for each other.

The shape of the IC card 840 is the same as the ninth embodiment.

The shape of electrically conductive relay members 1032A, 1032B is substantially triangular similarly to the tenth embodiment. However, the relay communication device 1030 differs from the tenth embodiment in that sides on a side closer to a slit 1030*a* are formed by curved lines 1032*d* to 1032*g*.

In other words, the electrically conductive plates 542A, 542B of the IC card 540 are substantially isosceles triangles in the sixth embodiment. In contrast, the electrically conductive relay members 1032A, 1032B are formed as substantially isosceles triangles in the eleventh embodiment.

As shown in FIG. 23B, the IC card 840 can thereby increase the communication stability with proper balance between shift in a left-right direction X and rotation relative to the relay communication device 1030, similarly to the sixth embodiment.

Validation Tests

Validation tests of the aforementioned embodiment were carried out as follows.

IC cards for validation tests were prepared as follows.

Aluminum foil of 10 µm thick is bonded to an electrically insulating film such as PET, PET-G, PVC or polyimide of credit card size at 188 µm thick and 85.5 mm×55 mm serving as the substrate. Patterning was performed by etching, and a pair of electrically conductive plates was formed of a predetermined shape. Then, a 150 µm thick IC chip was connected by way of anisotropic conductive paste, an anisotropic conductive film, a conductive adhesive, or the like so as to straddle the pair of conductive plates. A sheet of paper of 200 µm thick was further bonded through a gluing agent or adhesive so as to cover the electrically conductive plates and IC chip.

It should be noted that the thickness, shape and material of the substrate are not to be limited to these. In addition, the electrically conductive plate is not limited thereto. It may alternatively be possible that the electrically conductive plate is not only formed by punching a conductive material into a predetermined shape, then bonding with adhesive, gluing agent, or the like, but also formed using a printing method or the like. Furthermore, the IC chip may be prepared in such a manner: performing a resin mold process for a lead frame to which gold wires have been connected; and connecting the lead frame thus processed to the electrically conductive plate by solder, conductive adhesive, welding, or the like.

Figure 24A:
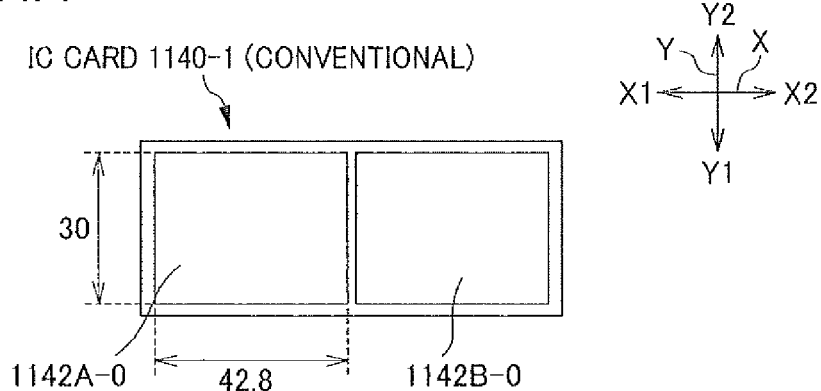
FIGS. 24A to 24C are plan views of IC cards 1140-0 to 1140-2 of validation tests.
Figure 24B:
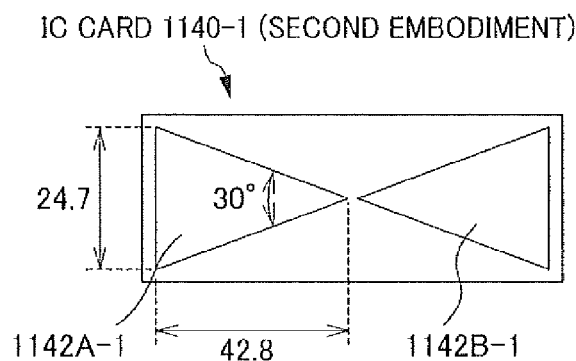
Figure 24C:
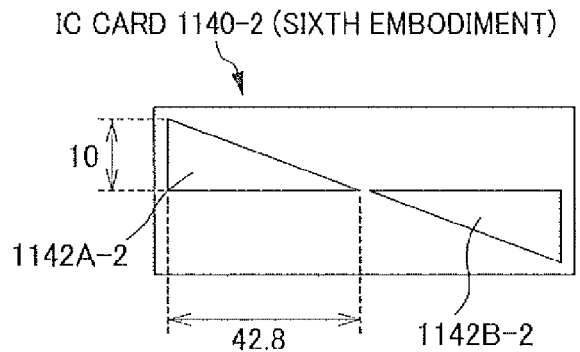

FIGS. 24A to 24C are plan views of IC cards 1140-0 to 1140-2 for the validation tests.

IC cards of three types of electrically conductive plates having different shapes were prepared in the validation tests.

The IC card 1140-0 (conventional shape) shown in FIG. 24A: The planar shapes of electrically conductive plates 1142A-0, 1142B-0) were 30-mm H×42.8-mm W rectangles.

The IC card 1140-1 (corresponding to the third embodiment) shown in FIG. 24B: The planar shapes of electrically conductive plates 1142A-1, 1142B-1 were isosceles triangles with a central angle of approximately 30 degrees.

The IC card 1140-2 (corresponding to the seventh embodiment) shown in FIG. 24C: The planar shapes of electrically conductive plates 1142A-2, 1142B-2 were right triangles with a central angle of approximately 15 degrees.

Electrically conductive relay members for the validation tests were prepared as follows.

Copper foil of 35 μm thick was bonded onto the entire surface of an electrically insulating material of 200 μm thick such as glass epoxy, polyimide, or PET. A loop antenna (size: 40 mm×40 mm) of three turns was formed by etching. A capacitor was connected in parallel to both ends of the antenna, and the capacitance of the capacitor was adjusted so that the resonance frequency was 14 MHz. Two electrically conductive plates formed from a 35 μm thick copper foil were connected with a spacing of 1 mm to both ends of the antenna.

It should be noted that the material, thickness, dimensions of the electrically conductive relay member; processing method, material, thickness, dimensions, number of turns, presence of a capacitor for frequency adjustment of the loop antenna, capacity of the capacitor, connection state (parallel/series) of the capacitor; frequency of the electrically conductive relay member; and number of electrically conductive plates connected to the loop antenna are not to be limited to these.

Figure 25A:
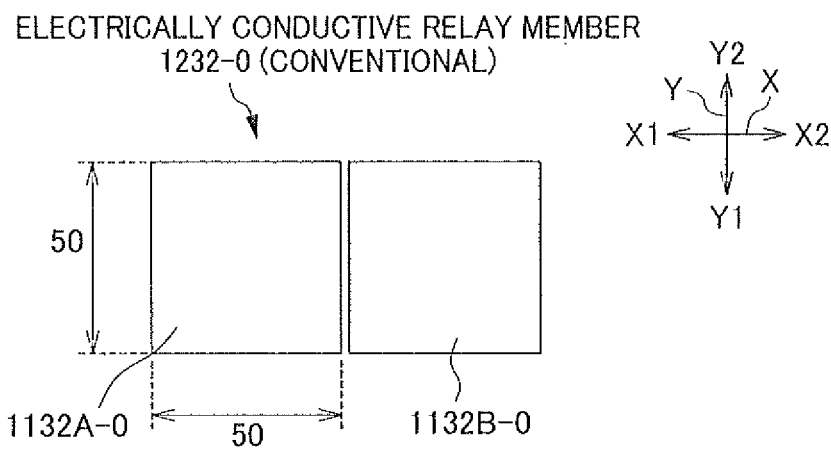
FIG. 25A is a plan view of a pair of electrically conductive relay members 1132-0 and FIG. 25B is a plan view of a pair of electrically conductive relay members 1132-1 of validation tests.
Figure 25B:
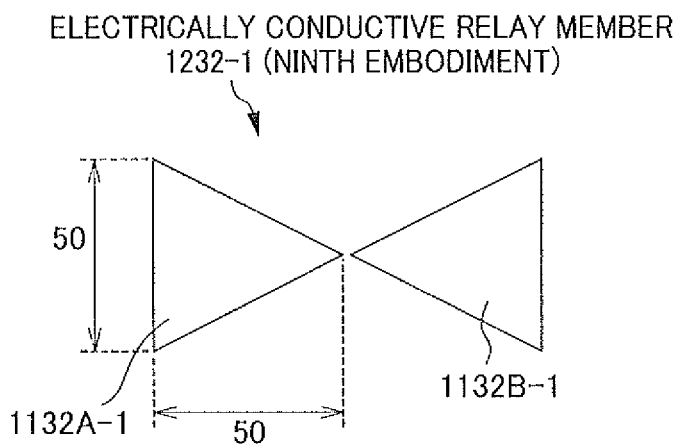

FIGS. 25A and 25B are plan views of electrically conductive relay members 1132-0, 1132-1 of the validation tests.

Electrically conductive relay members of two different types of shapes were prepared in the validation tests.

The electrically conductive relay member 1132-0 (conventional shape) shown in FIG. 25A: The planar shapes of electrically conductive relay members 1132-A-0, 1132B-0 were 50-mm H×50-mm W squares.

The electrically conductive relay member 1132-1 (corresponding to the tenth embodiment) shown in FIG. 25B: The planar shapes are equilateral triangles.

Validation Test Method

FIGS. 26A and 26B are plan views illustrating the test method for validation tests.

It should be noted that FIGS. 26A and 26B show the test method for a combination of the conventional IC card 1140-0 and the conventional electrically conductive relay member 1132-0. However, the same test method is applicable to other combinations.

The range of communication connection was measured as follows.

As shown in FIG. 26A, a normal position of this validation test was set so that the center point of the IC card was adjusted in agreement with the center point of the electrically conductive relay members, and the longer direction of the IC card was adjusted in parallel with the longer direction of the relay member. As shown in FIG. 26B, the IC card was rotated one turn clockwise relative to the electrically conductive relay member while the center point of the IC card and the center point of the relay member were matched, and the range of communication connection was measured. The range of communication connection is represented by a rotational angle θ (deg) formed between a center line in a longer direction of the IC card and a center line in a longer direction of the electrically conductive relay member.

In other words, the validation test verifies to what extent of rotational shift is permitted for the IC card originally at the normal position shown in FIG. 26A with respect to a read/writer, when a user places the IC card on the reader/writer.

Test Results

FIG. 27 is a table (Table 11) showing the results of the validation tests.

(a) As shown in field 11a, in the case of the combination of the conventional IC card 1140-0 and the conventional electrically conductive relay member 1132-0, the range of communication connection was a total of 40 degrees.

In addition, the communicable range of the rotational angles θ=0 to 10 degrees indicates that it is not possible to communicate when the IC card is rotated 10 degrees or more from the normal position (θ=0 degrees). For example, in an actual usage scenario of the IC card by a user, it is rightly assumed that the shift between the IC card and reader/writer is θ=10 degrees or higher. As a result, in the actual use situation, there is a case in which this combination fails to communicate, and thus the user-friendliness is considered to be poor.

(b) As shown in field 11b, in the case of the combination of the conventional electrically conductive relay member 1132-0 and the IC card 1140-1 (third embodiment), the range of communication connection increased drastically to a total of 300 degrees.

In addition, the successful communication connection in a case of rotation angles θ=0 to 75 degrees indicates that it is possible to communicate from the normal position (θ=0 degrees) until θ=75 degrees. For example, in an actual usage scenario of the IC card by a user, if the shift between the IC card and reader/writer is permitted up to θ=75 degrees, it is considered that a problem will not arise in practical use.

Based on this, it could be confirmed that the user-friendliness can be improved if the IC card 1140-1 (third embodiment) is employed with a conventional reader/writer.

(c) As shown in field 11c, in the case of the combination of the conventional relay member 1132-0 and the IC card 1140-2 (seventh embodiment), the range of communication connection was further increased to a total of 330 degrees.

Based on this, it could be confirmed that the user-friendliness can be improved much more if the IC card 1140-2 (seventh embodiment) is employed with a conventional reader/writer.

(d) As shown in field 11d, in the case of the combination of the electrically conductive relay member 1132-1 (tenth embodiment) and the IC card 1140-0 (conventional shape), the range of communication connection increased, similarly to the combination of the above-mentioned (b).

Based on this, it could be confirmed that the user-friendliness can be improved much more, similarly to the combination of the above-mentioned (b), even if the conventional IC card 1140-0 is employed with the electrically conductive relay member 1132-1 (tenth embodiment).

It should be noted that, although the validation tests were performed for parts of the above-mentioned first to eleventh embodiments, it can be rightly anticipated based on these validation experiments that the range of communication connection of other embodiments will increase more than the combination of the above-mentioned (a).

In addition, although the range of communication connection relative to rotation is explained herein, the tolerance to displacement of the center positions of the electrically conductive relay member and the IC card 1 in the left-right direction X (longer direction) has also been confirmed to increase when the information recording medium or relay communication device of the embodiments is used.

Twelfth Embodiment

Hereinafter, a twelfth embodiment of the present invention will be explained while referring to the drawings, etc.

FIGS. 28A and 28B are views illustrating the communication method of a communication system 2001 of the twelfth embodiment.

FIG. 28A is a schematic diagram illustrating the communication method of the communication system 2001.

FIG. 28B is a perspective view illustrating the communication method of a reader/writer 21, a relay communication device 30, and an IC card 2040.

When compared with the first to eleventh embodiments, the communication system 2001 of the present embodiment differs as follows in the form of electrically conductive plates 2042A, 2042B, as shown in FIG. 28B.

The electrically conductive plates 2024A, 2042B are each triangular aluminum foil or the like with a thickness of 10 μm and base side×height of 20 mm×40 mm. The electrically conductive plates 2042A, 2042B are bonded to a lower layer 2043. The details of the electrically conductive plates 2042A, 2042B will be described later.

Communication between the reader/writer 21 and IC card 2040 via the relay communication device 30 is similar to the first to eleventh embodiments (refer to FIGS. 1, 11, etc.).

FIGS. 29A-29B and 30A-30B are views illustrating communication systems 2101, 2201 employing other communication methods of the twelfth embodiment.

It should be noted that, in the explanation and drawings of the communication systems 2101, 2201, the same symbols or the same ending symbols are assigned to portions carrying out functions similar to the aforementioned communication system 2001, and redundant explanations will be omitted as appropriate.

Figures 29A, 29B:
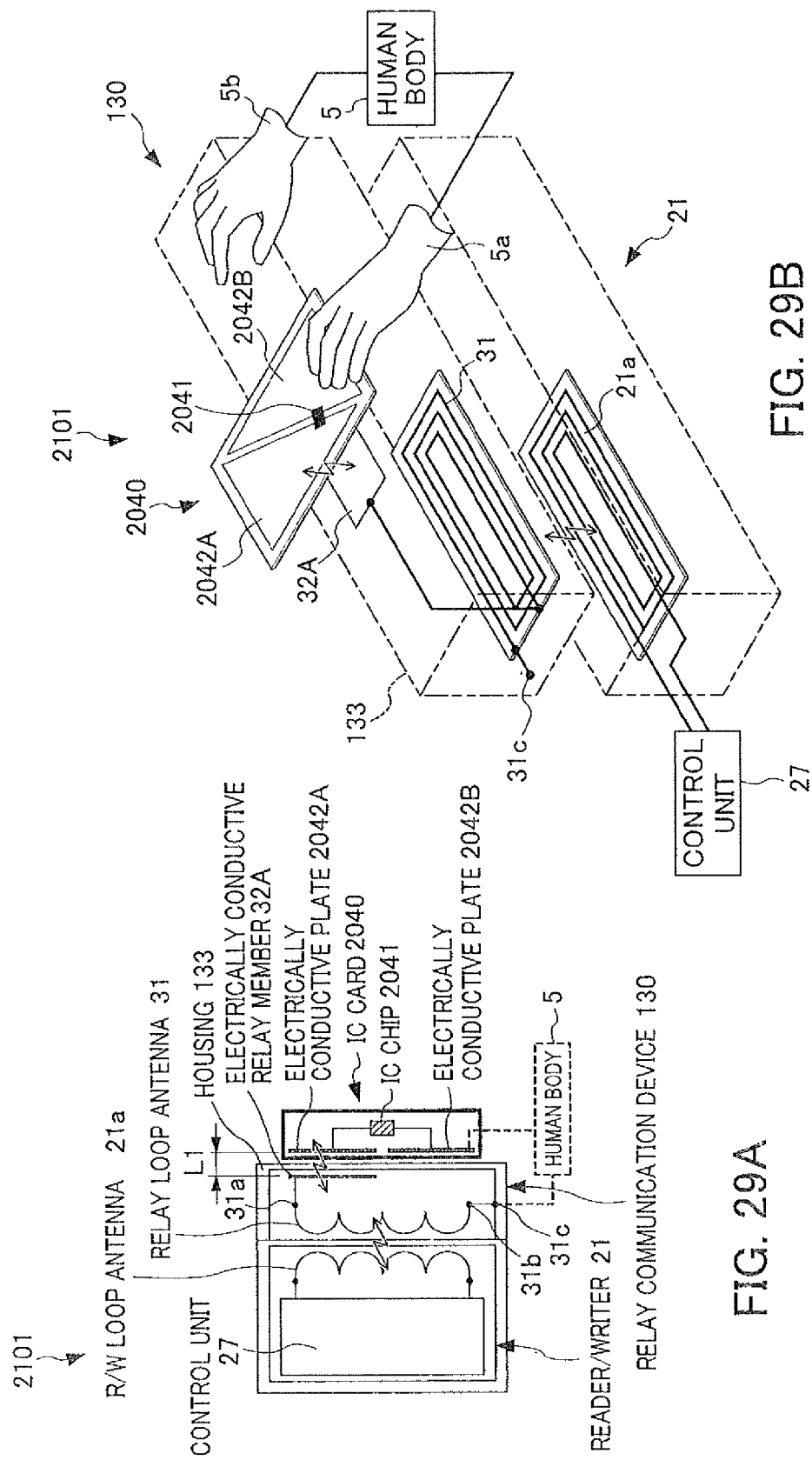
FIGS. 29A and 29B are diagrams illustrating a communication system 2101 employing another communication method of the twelfth embodiment.

As shown in FIGS. 29A and 29B, a relay communication device 130 of the communication system 2101 includes a relay loop antenna 31, electrically conductive relay member 32A, and housing 133 (relay housing).

One end 31*a* of the relay loop antenna 31 is electrically connected to the electrically conductive relay member 32A by an electrical cable. In addition, the other end 31*b* is electrically connected to the housing 133 by an electrical cable. The connection means of a connection part 31*c* of the housing 133 with the electrical cable is a screw clamp, for example.

In the communication system 2101, an electrically conductive relay member 32B (refer to FIGS. 28A-28B) is not provided, and only the single electrically conductive relay member 32A is provided. The electrically conductive relay member 32A is electrically insulated relative to the housing 133, i.e. is electrically insulated relative to the housing 133.

The housing 133 is a case member of the relay communication device 130. Since the housing 133 is externally exposed, it can be touched by a hand 5*b* of a user.

The communication system 2101 performs communication as follows when the reader/writer 21 is communicably connected with the IC card 2040 via the relay communication device 130. Connection between Reader/writer 21 and Relay Communication Device 130

A R/W loop antenna 21*a* is connected with the relay loop antenna 31 similarly to the communication system 2001 (refer to FIGS. 28A-28B).

The way of using the IC card 2040 by the user is as follows.

(1) A region corresponding to the electrically conductive plate 2042B of the IC card 2040 is held by one hand 5*a* (or the other hand 5*b*).

(2) A region corresponding to the electrically conductive plate 2042A is brought near the electrically conductive relay member 32A (distance between the electrically conductive relay member 32A and electrically conductive plate 2042A is approximately 2 mm).

(3) The housing 133 is touched by the other hand 5*b* (or the one hand 5*a*).

Between the relay communication device 130 and IC card 2040 is thereby connected in the following way.
Connection Between Relay Communication Device 130 and IC Card 2040

The electrically conductive relay member 32A connected to the end 31*a* of the relay loop antenna 31 and the electrically conductive plate 2042A function as capacitor plates, and these two are contactlessly connected through electrostatic coupling.

The housing 133 connected to the end 31*b* of the relay loop antenna 31 and a human body 5 of the user are electrically connected by the hand 5*b* of the user touching the housing 133. In addition, the human body 5 and the electrically conductive plate 2042B are electrostatically coupled by the user holding the region corresponding to the electrically conductive plate 2042B of the IC card 2040 with the hand 5*a*. In other words, the end 31*b* of the relay loop antenna 31 and the electrically conductive plate 2042B are electrically connected via the human body 5.

Between the relay communication device 130 and the IC card 2040 are thereby connected through electrostatic coupling (capacitive coupling) to be able to send and receive information.

According to the above operations, electromotive force occurs due to electromagnetic induction (electromagnetic coupling) of the relay loop antenna 31 with the R/W loop antenna 21*a*. Accordingly, the electrically conductive relay member 32A electrostatically couples with the electrically conductive plate 2042A, whereby the driving power is transmitted to the IC chip 2041. In addition, data transmitted from the reader/writer 21 can be conveyed to the IC chip 2041, while reply data from the IC chip 2041 can be conveyed to the reader/writer 21 via the relay communication device 130.

It should be noted that, in the example of FIGS. 29A-29B, the IC card 2040, i.e. the electrically conductive plate 2042A, is electrostatically coupled to the electrically conductive relay member 32A, and the electrically conductive plate 2042B is made to electrostatically couple to the human body 5. However, conversely thereto, it may alternatively be that the electrically conductive plate 2042A is electrostatically coupled to the human body 5, and the electrically conductive plate 2042B is made to electrostatically couple to the electrically conductive relay member 32A. In such an alternative case, the communication system 2101 functions the same, and the same communication processing is done.

As shown in FIGS. 30A-30B, the communication system 2201 differs from the communication system 2101 in that the end 31b of the relay loop antenna 31 of the relay communication device 230 is electrically connected to ground GND.

The ground GND is a surface of a reference potential, which is an installation surface or the like for the reader/writer 21 and relay communication device 230.

The connection between the end 31b of the relay loop antenna 31 and the ground GND may be any configuration. For example, the end 31b and a housing 233 is connected at the connection part 31c, which is grounded using the following methods.

The housing 233 is directly installed on the ground GND to establish electrical continuity to the ground GND.

The housing 233 is electrically connected to the ground GND via the housing of the reader/writer 21.

The housing 233 is connected to the ground GNU by an electrical cable.

In addition, so long as the housing 233 is adaptable to connection to the ground GND, it may be the same as the housing 133 of the communication system 2101.

The communication system 2201 differs from the communication system 2101 in the connection between the electrically conductive plate 2042B of the IC card 2040 and the end 31b of the relay loop antenna.

The IC card 2040 is used by a user as follows.

(1) The user is at the ground GND (e.g., the user stands on a floor surface, etc. that is the ground GND).

(2) The user holds a region corresponding to the electrically conductive plate 2042B of the IC card 2040 by one hand 5b.

(3) The user brings a region corresponding to the electrically conductive plate 2042A near the electrically conductive relay member 32A (distance between the electrically conductive relay member 32A and the electrically conductive plate 2042A is approximately 2 mm).

More specifically, the communication system 2201 differs from the communication system 2101 in that the user is not required to touch the housing 233 with the hand 5b.

In this manner, the relay communication device 230 is communicably connected with the IC card 2040 as follows.
Connection Between Relay Communication Device 230 and IC Card 2040

The conductive member 232 electrostatically couples with conductive plate 2042A similarly to the communication system 2101.

The housing 233 connected to the end 31b of the relay loop antenna 31 is connected to the ground GND.

The human body 5 electrostatically couples with the electrically conductive plate 2042B when the user holds the region corresponding to the electrically conductive plate 2042B of the IC card 2040. Since the user is positioned on the ground GND, the electrically conductive plate 2042B is connected to the ground GND via the human body 5. As a result, the electrically conductive plate 2042B is connected with the end 31b of the relay loop antenna 31 via the human body 5, the ground GND and housing 233. Accordingly, a loop is established: relay loop antenna 31 to electrically conductive relay member 32A to electrically conductive plate 2042A to IC chip 2041 to electrically conductive plate 2042B to human body 5 to ground GND to housing 233 to relay loop antenna 31.

In this manner, it is possible for the communication system 2201 to perform communication between the IC card 2040 and relay communication device 230 similarly to the communication systems 2001, 2101.

It may be preferable but not necessary that the installation surface of the floor space, etc. used as the ground GND is made of an electrically conductive material (e.g., a metal plate, conductive rubber, conductive carpet, etc.). The reason for this is that since the stability of the ground GND is increased, the performance of electrically continuity between the electrically conductive plate 2042B and the end 31b of the relay loop antenna 31 increases, whereby more stable communication processing is performed.

Next, the arrangement in a plan view of the IC chip 2041 and the electrically conductive plates 2042A, 2042B of the IC card 2040 will be explained.

Figure 31A:
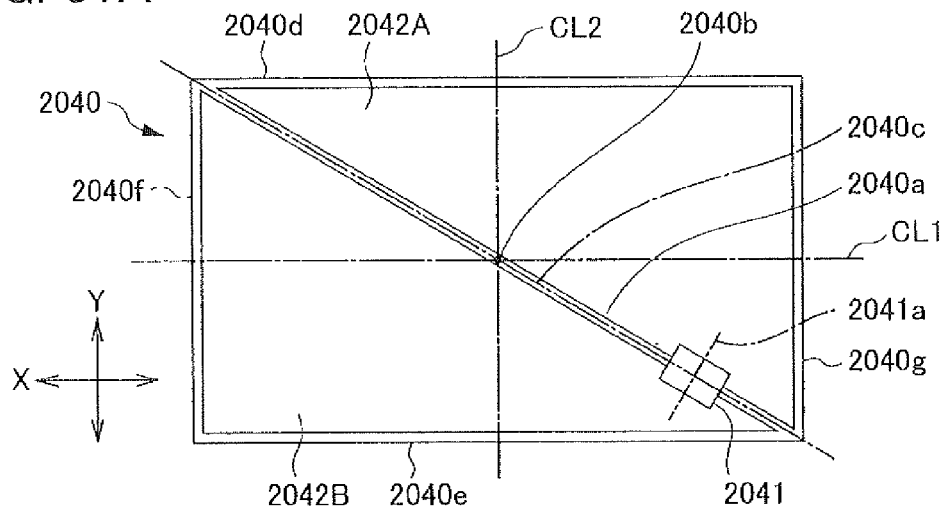
FIGS. 31A to 31C are plan views of an IC card 2040 of the twelfth embodiment, and perspective views in a case of bending.
Figure 31B:
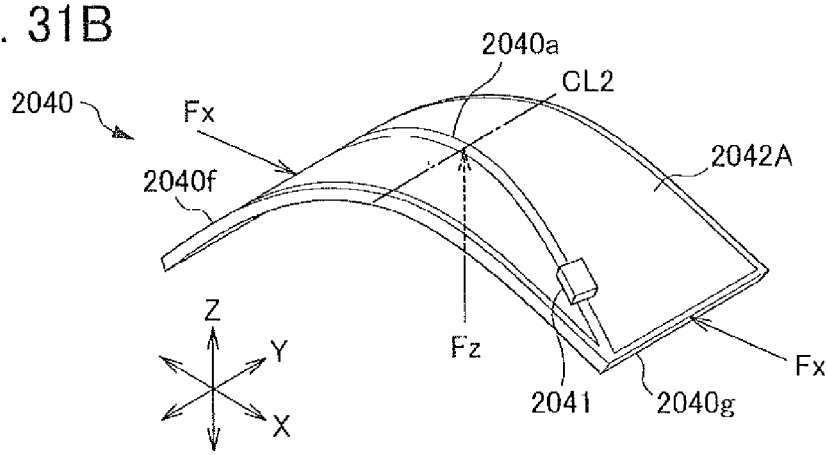
Figure 31C:
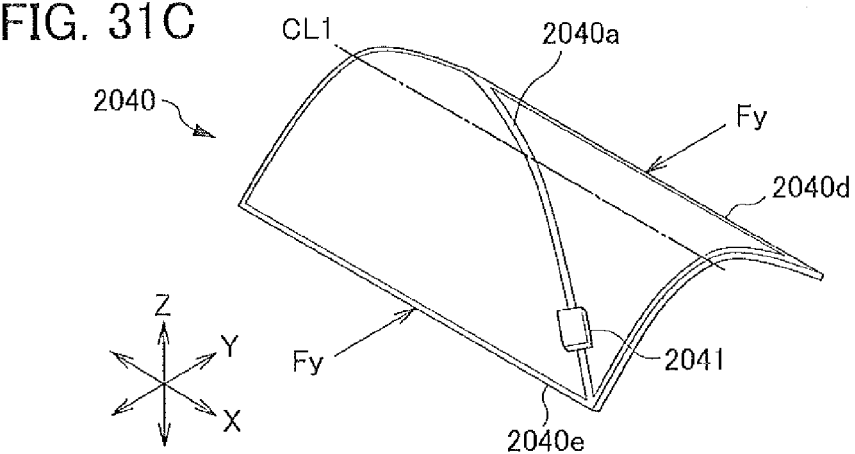

FIG. 31A is a plan view of the IC card 2040 of the twelfth embodiment, and FIGS. 31B and 31C are perspective views illustrating the bent IC card 2040.

As shown in FIG. 31A, the electrically conductive plates 2042A, 2042B are provided over almost the entire region of the IC card 2040. As a result, it is possible to increase the installation region of the electrically conductive plates 2042A, 2042B so as to implement stable communication processing.

The planar shape of the IC card 2040 is a rectangle that is long in a left-right direction X.

The electrically conductive plates 2042A, 2042B are arranged across a slit 2040a provided on a diagonal line 2040c of the IC card 2040. As a result, the electrically conductive plates 2042A, 2042B are point symmetrical relative to a center 2040b of the IC card 2040, so that they are arranged balanced and have the same area. In this manner, it is possible for the IC card 2040 to suppress variation in the sensitivity of the electrostatic coupling accompanying a difference in the left-right direction X, vertical direction Y, and top-bottom side orientation, when the IC card 2040 is placed on the reader/writer 21.

In addition, since the slit 2040a is provided on the diagonal line 2040c, it is possible to prepare the electrically conductive plates 2042A, 2042B by a cutting tool that is traversed along the diagonal line 2040c. As a result, it is possible to prepare the electrically conductive plates 2040A, 2042B without an expensive technique such as etching. Since the production is simple, it is possible to drastically reduce the cost.

In addition, since the slit 2040a is provided on the diagonal line 2040c of the IC card 2040, it has portions not overlapping with a horizontal center line CL1 (first center line) parallel to long sides 2040d, 2040e of the IC card 2040, and a vertical center line CL2 (second center line) parallel to short sides 2040f, 2040g that are orthogonal to the long sides 2040d, 2040e. In the region of the slit 2040a, the IC chip 2041 is arranged in a lower-right portion in FIG. 31A that does not overlap with the horizontal center line CL1 and the vertical center line CL2.

Herein, when a plate having a shape of a card such as the IC card 2040 is folded, the stress tends to act on the horizontal center line CL1 and vertical center line CL2, and bending easily occurs at these locations.

For example, as shown in FIG. 31B, the IC card 2040 folds so that the vicinity of the vertical center line CL2 bends the most, when a force Fx acts on the short sides 2040f, 2040g in the left-right direction X. In this case, the largest stress is imparted in the vicinity of the vertical center line CL2.

In addition, when a force Fz acts on the back surface (or top surface) in a thickness direction Z, the IC card 2040 normally easily folds so that the vicinity of the vertical center line CL1 bends most. The largest stress is imparted in the vicinity of the vertical center line CL2, as shown in FIG. 31B.

Furthermore, as shown in FIG. 31C, the IC card 2040 folds so that the vicinity of the horizontal center line CL1 bends most when a force Fy acts on the long sides 2040d, 2040e in the vertical direction Y.

In the IC card 2040, the IC chip 2041 is arranged in a region differing from the horizontal center line CL1 and vertical center line CL2 so that the IC chip 2041 avoids being disposed in the vicinities of the horizontal center line CL1 and the vertical center line CL2 at which the largest stress is imparted. Accordingly, it is possible to prevent damage of the IC chip 2041.

Figure 32:
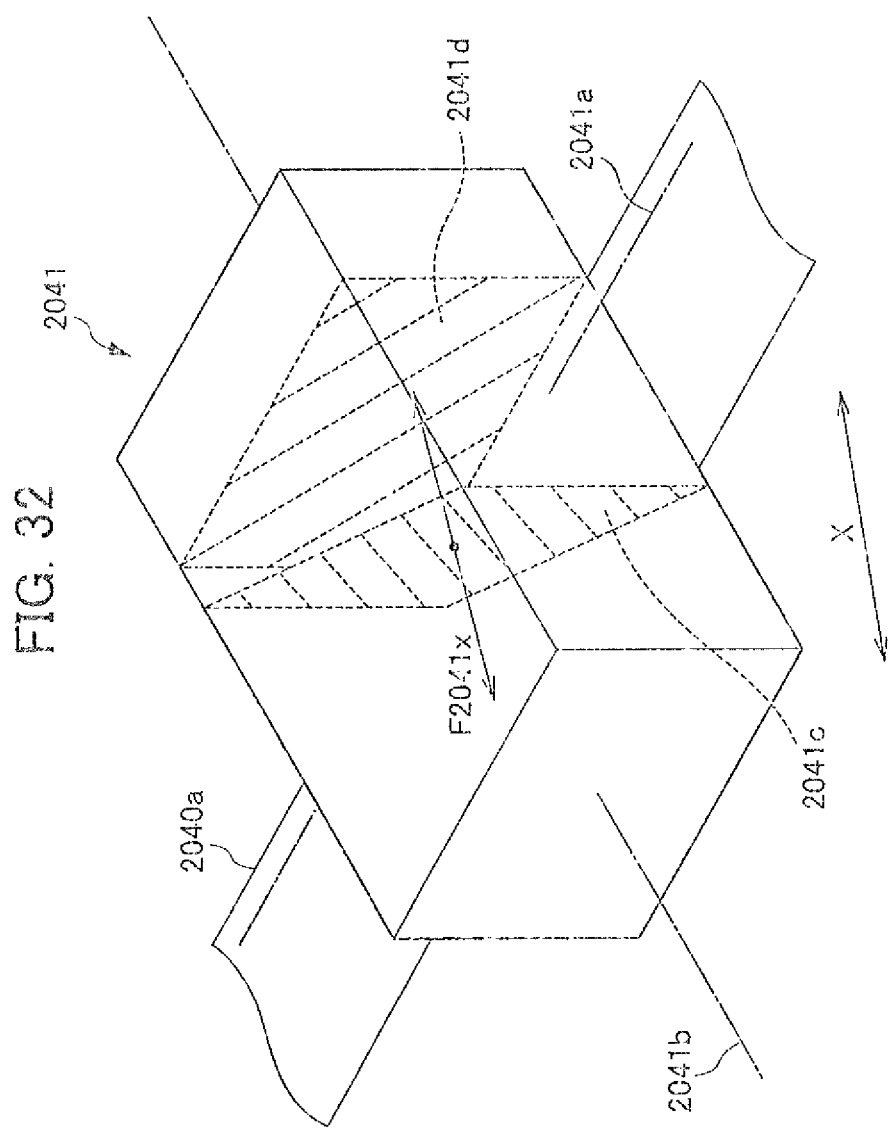
FIG. 32 is an enlarged perspective view of the vicinity of an IC chip 2041 of the twelfth embodiment.

FIG. 32 is an enlarged perspective view of a vicinity of the IC chip 2041 of the twelfth embodiment.

The shape of the IC chip 2041 is a rectangular solid. The IC chip 2041 is arranged so that a central axis 2041a of a minor axis of the IC chip 2041 is orthogonal to the diagonal line 2040c of the IC card in a plan view (refer to FIG. 31A).

As a result, the IC chip 2041 has the central axis 2041a sloped relative to the horizontal center line CL1 parallel to the left-right direction X, and the vertical center line CL2 parallel to the vertical direction Y (refer to FIG. 31A). As a result, an area of a cross-section 2041c orthogonal to the left-right direction X is larger than an area of a cross-section 2041d orthogonal to the central axis 2041a of the IC chip 2041.

Herein, when the IC card 2040 is folded in the left-right direction X (refer to FIG. 31B), a largest tensile force F2041x acts on the IC chip 2041 in the left-right direction X. It is possible for the IC chip 2041 to decrease the maximum stress since the cross-section 2041c is larger than the cross-section 2041d. In other words, by arranging the IC chip 2041 to slope the central axis 2041a relative to the horizontal center line CL1 and vertical center line CL2, it is possible to decrease more the internal stress acting on the IC chip 2041 than arranging the central axis 2041a to be parallel to the horizontal center line CL1.

The IC chip 2041 can thereby suppress damage such as cracks. The decrease in the internal stress is similarly implemented for a case where the IC card 2040 is folded in the vertical direction Y.

It should be noted that, depending on the positions of the connection terminals, the IC chip 2041 can similarly decrease stress to suppress damage, if a central axis 2041b of the major axis is arranged orthogonal to the diagonal line 2040c.

In this way, the IC card 2040 can further prevent damage of the IC chip 2041 by not only arranging the IC chip 2041 to avoid a portion at which the largest stress is imparted, but also arranging the central axis 2041a to be sloped relative to the horizontal center line CL1 and the vertical center line CL2.

As explained in the foregoing, in the communication system 2001 of the present embodiment, the IC card 2040 can prevent damage of the IC chip 2041 by not only arranging the IC chip 2041 at a portion in which the horizontal center line CL1 and the vertical center line CL2 do not overlap, but also arranging the direction of the central axis 2041a to slope relative to the horizontal center line CL1 and the vertical center line CL2.

Thirteenth Embodiment

Next, a thirteenth embodiment of the present invention will be explained.

It should be noted that, in the following explanation and drawings, the same symbols or the same ending symbols are assigned to portions carrying out functions similar to the aforementioned twelfth embodiment, and redundant explanations will be omitted as appropriate.

Figure 33A:
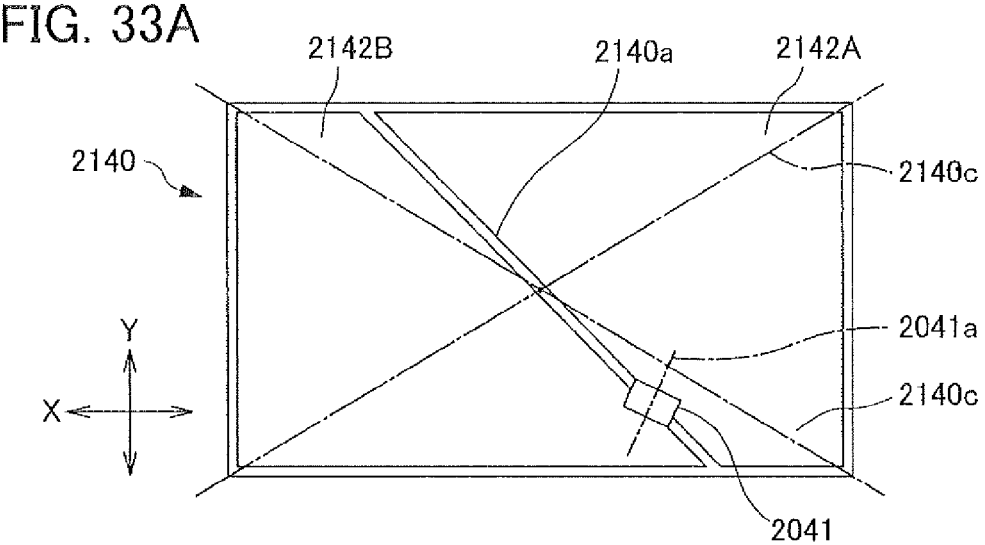
FIGS. 33A to 33C are plan views of IC cards 2140 to 2340 of a thirteenth embodiment.
Figure 33B:
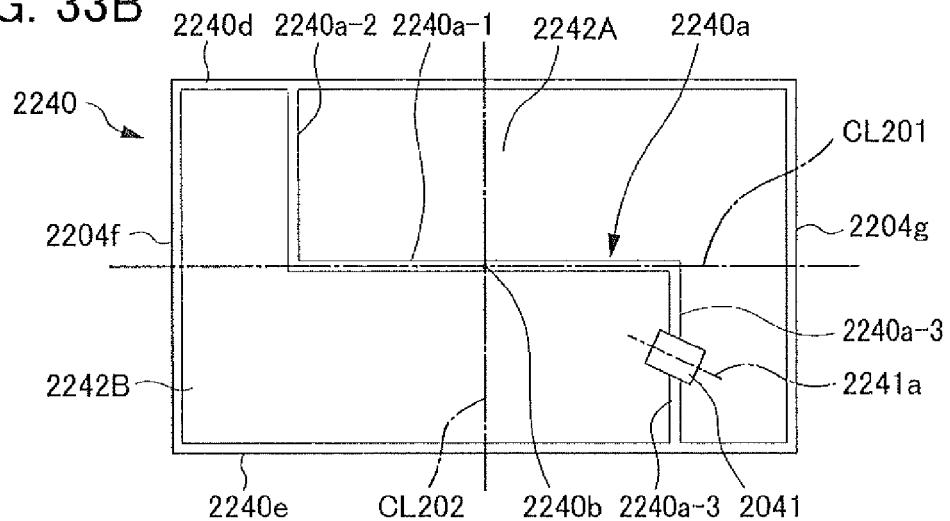
Figure 33C:
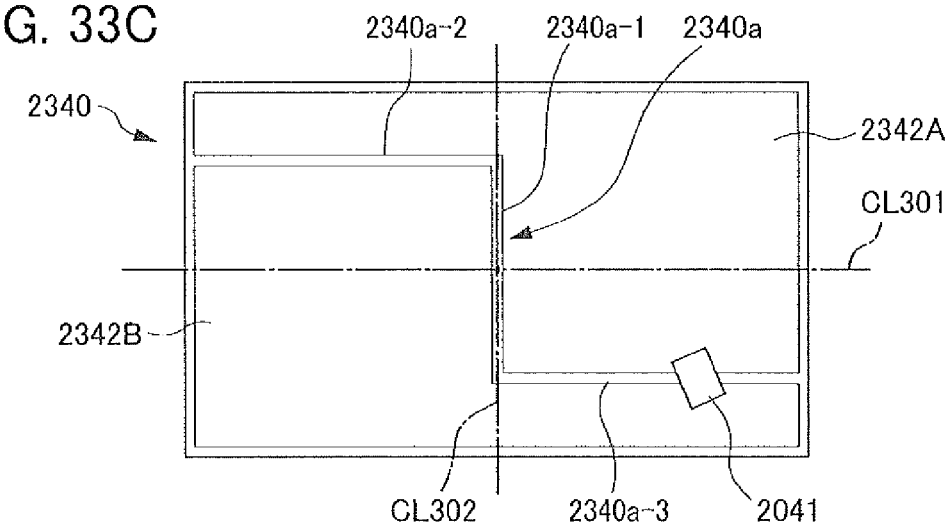

FIGS. 33A to 33C are plan views of IC cards 2140 to 2340 of the thirteenth embodiment.

As shown in FIG. 33A, a slit 2140a of the IC card 2140 is arranged on a straight line sloped clockwise from a diagonal line 2140c. A major axis of the IC chip 2041 is arranged to slope relative to center lines CL1, CL2 of the IC card 2140 and the slit 2140a. The IC card 2140 can improve the degrees of freedom in the arrangement of an IC chip 2041 over the twelfth embodiment by adjusting an inclination angle of the slit 2140a.

As shown in FIG. 33B, the slit 2240a of the IC card 2240 has a portion 2240a-1 on the horizontal center line (portion on first center line) and vertical portions 2240a-2, 2240a-3.

The portion 2240a-1 on the horizontal center line is parallel to long sides 2240d, 2240e, and provided on a horizontal center line CL201 (first center line).

The vertical portions 2240a-2, 2240a-3 are connected stepwise to the portion 2240a-1 on the horizontal center line, and are parallel to short sides 2240f, 2240g. The vertical portions 2240a-2, 2240a-3 are arranged to be point symmetrical with respect to a center 2240b. An IC chip 2041 is arranged at the vertical portion 2240a-3.

The IC card 2240 can thereby improve the degrees of freedom in arrangement of the IC chip 2041 over the twelfth embodiment by adjusting the length of the portion 2240a-1 on the horizontal center line in the left-right direction X and the position of the vertical portions 2240a-2, 2240a-3 in the left-right direction X. In addition, it is possible for the IC card 2240 to decrease the stress acting on the IC chip 2041 since the IC card tends to have a tolerance to folding along the slit due to having a region in which the slit is not formed on the extension of a straight line of the vertical portion 2240a-3 on which the IC chip 2041 is arranged. In addition, electrically conductive plates 2242A, 2242B are arranged point symmetrical with respect to the center 2240b in the IC card 2240. Accordingly, it is possible to arrange the electrically conductive plates 2242A, 2242B to be balanced in the IC card 2240, similarly to the twelfth embodiment.

In addition, since the IC chip 2041 is arranged at the vertical portion 2240a-3, it is arranged in a different region from the horizontal center line CL201 and the vertical center line CL202. Furthermore, a central axis 2041a of the major axis of the IC chip 2041 slopes relative to the horizontal center line CL201, vertical center line CL202, and slit 2240a-3. The IC card 2240 can thereby prevent damage of the IC chip 2041, similarly to the twelfth embodiment.

It should be noted that it is possible for an IC card 2340 shown in FIG. 33C to increase the degrees of freedom in arrangement of an IC chip 2041 similarly to the IC card 2240, if a slit 2340a is configured by a portion 2340a-1 on the vertical center line and horizontal portions 2340a-2, 2340a-3.

Although embodiments of the present invention have been explained above, the present invention is not to be limited to the aforementioned embodiments, and various modifications and alterations as in the modified embodiments are possible, which are also within the technical scope of the present invention. In addition, the effects described in the embodiments are merely exemplifying the most advantageous effects produced from the present invention, and the effects by the present invention are not limited to those described in the embodiments. It should be noted that the aforementioned embodiments and the modified embodiments described later can also be used in combination as appropriate; however, detailed explanations thereof will be omitted.

Modified Embodiments (1) An example of communicating between the R/W loop antenna and the relay loop antenna through electromagnetic induction has been shown in the embodiments; however, it is not limited thereto. For example, it may alternatively be possible that the R/W loop antenna is communicably connected with the relay loop antenna through electromagnetic coupling.

(2) An example in which the planar shape of the IC card is a rectangle has been shown in the embodiments; however, it is not limited thereto. For example, it may alternatively be possible that the planar shape of the IC card is a square, circle, or ellipse.

(3) An example in which the form of the IC chip is a rectangular solid has been shown in the embodiments; however, it is not limited thereto. For example, it may alternatively be possible that the shape of the IC chip is a cube.

INDUSTRIAL APPLICABILITY

Application is possible to an inexpensive electronic recording medium that allows for contactless reading and writing such as various electronic devices, and above all, to a communication system using an inexpensive contactless IC card.

The invention claimed is:

1. A communication system comprising:
an information recording medium;
an electromagnetic induction communication device; and
a relay medium interposed between the information recording medium and the electromagnetic induction communication device, the system performing contactless communication between the information recording medium and the electromagnetic induction communication device through the relay medium,
wherein the information recording medium comprises an IC chip configured for communication through electromagnetic induction, and a first pair of electrically conductive plates connected to the IC chip,
wherein the relay medium includes a second pair of electrically conductive plates and a loop antenna, one of the second pair of electrically conductive plates being connected to a beginning end of the loop antenna, and the other of the second pair of electrically conductive plates being connected to a terminal end of the loop antenna, and
wherein the electromagnetic induction communication device includes a loop antenna to perform communication with the information recording medium.

2. The communication system according to claim 1, wherein the relay medium is integrated into the electromagnetic induction communication device.

3. The communication system according to claim 1, wherein the electromagnetic induction communication device communicates with the relay medium through electromagnetic induction, and the relay medium communicates with the information recording medium through electrostatic coupling.

4. The communication system according to claim 1, wherein the second pair of electrically conductive plates provided to the relay medium communicates with the first pair of electrically conductive plates provided to the information recording medium in a state in which the first and the second pair of electrically conductive plates at least partially overlap each other.

5. The communication system according to claim 1, wherein the second pair of electrically conductive plates provided to the relay medium and the first pair of electrically conductive plates provided to the information recording medium comprise different materials from each other.

6. An information recording medium used in the communication system according to claim 1.

7. The information recording medium according to claim 6, wherein the information recording medium is an IC card.

8. The information recording medium according to claim 6, wherein the information recording medium is an IC label.

9. A relay communication device used in a communication system that includes: an electromagnetic induction communication device having a communication loop antenna, and a control unit configured to perform communication processing via the communication loop antenna;
the relay communication device having a relay loop antenna configured to communicate with the communication loop antenna through electromagnetic induction or electromagnetic coupling, and a pair of electrically conductive relay members connected to both ends of the relay loop antenna and disposed across a slit; and
an information recording medium having an IC chip configured for communication through electromagnetic induction or electromagnetic coupling, and a pair of electrically conductive plates that is disposed across and connected to the IC chip, and electrostatically coupled to the pair of electrically conductive relay members of the relay communication device, the information recording medium performing communication processing with the control unit of the electromagnetic induction communication device via the relay communication device,
wherein each of the pair of electrically conductive relay members has one width on a side closer to the slit configured to be narrower than another width on an opposite side, when a top surface of the relay communication device is viewed from a normal direction, and is configured to permit at least one of displacement and rotation relative to the pair of electrically conductive plates.

10. The relay communication device according to claim 9, wherein a shape of each of the electrically conductive relay members on the side closer to the slit is rectangular having a constant width.

11. The relay communication device according to claim 10, wherein the shape of each of the pair of electrically conductive plates is curved so that a proportion by which the width of each of the pair of electrically conductive relay members narrows becomes smaller as the width approaches the side closer to the slit from the opposite side.

12. The relay communication device according to claim 9, wherein a shape of each of the electrically conductive relay members is substantially of a triangle, a width of which becomes narrower as the width approaches the side closer to the slit from the opposite side.

13. The relay communication device according to claim 9, wherein the width narrows linearly at a constant ratio when the width approaches the side closer to the slit from the opposite side.

14. The relay communication device according to claim 12, wherein an angle of the triangle on the side closer to the slit is no more than 30 degrees.

15. The relay communication device according to claim 9, wherein the pair of electrically conductive relay members is disposed to be point symmetrical.

* * * * *